(12) United States Patent
Kasahara

(10) Patent No.: US 11,870,777 B2
(45) Date of Patent: Jan. 9, 2024

(54) RELAY DEVICE AND COMMUNICATION SYSTEM

(71) Applicant: Mitsubishi Electric Corporation, Tokyo (JP)

(72) Inventor: Saburo Kasahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 530 days.

(21) Appl. No.: 17/054,176

(22) PCT Filed: May 18, 2018

(86) PCT No.: PCT/JP2018/019329
§ 371 (c)(1),
(2) Date: Nov. 10, 2020

(87) PCT Pub. No.: WO2019/220632
PCT Pub. Date: Nov. 21, 2019

(65) Prior Publication Data
US 2021/0194876 A1 Jun. 24, 2021

(51) Int. Cl.
G06F 7/04 (2006.01)
H04L 9/40 (2022.01)
H04B 7/15 (2006.01)

(52) U.S. Cl.
CPC ........... *H04L 63/0876* (2013.01); *H04B 7/15* (2013.01)

(58) Field of Classification Search
CPC . G06F 21/44; H04L 63/0227; H04L 63/0236; H04L 63/0281; H04L 63/0876; H04W 12/06
See application file for complete search history.

(56) References Cited

U.S. PATENT DOCUMENTS 6,590,898 B1* 7/2003 Uzun ............... H04L 45/02
370/408
2008/0037557 A1* 2/2008 Fujita ............... H04L 12/4641
370/395.53
(Continued)

FOREIGN PATENT DOCUMENTS

JP 2001-186186 A 7/2001
JP 2008-293399 A 12/2008
JP 2012-49588 A 3/2012

OTHER PUBLICATIONS

Casetti et al, Data Connectivity and Smart Group Formation in Wi-Fi Direct-Multi-Group Networks, IEEE, Oct. 24, 2017, pp. 245-259. (Year: 2017).*

(Continued)

*Primary Examiner* — Philip J Chea
*Assistant Examiner* — Jenise E Jackson
(74) *Attorney, Agent, or Firm* — XSENSUS LLP

(57) ABSTRACT

A relay device includes a plurality of input/output ports (111); an authentication information storage unit (114) to store authentication information used for performing authentication of a target relay device which is a relay device to be authenticated; an authentication processing unit (113) to acquire a target authentication packet which is an authentication packet used for authentication of the target relay device via a target input/output port (111) which is an input/output port connected to the target relay device in the plurality of input/output ports and to authenticate the target relay device by referring to the authentication information, and a relay processing unit (112) to cause a transfer input/output port which is an input/output port (111) to which a transfer destination of the transfer packet is connected, and to discard the transfer packet when the authentication of the target relay device is failed.

10 Claims, 22 Drawing Sheets

(56) References Cited

U.S. PATENT DOCUMENTS

| | | | |
|---|---|---|---|
| 2008/0075076 A1* | 3/2008 | Shimada | H04L 12/66 370/389 |
| 2010/0014860 A1* | 1/2010 | Nakagawa | H04N 21/26603 725/118 |
| 2012/0054358 A1* | 3/2012 | Yamada | H04L 63/0869 709/229 |
| 2012/0054830 A1 | 3/2012 | Yamada | |
| 2012/0057601 A1* | 3/2012 | Voruganti | H04L 12/5601 370/389 |
| 2013/0077509 A1* | 3/2013 | Hirota | H04L 43/106 370/252 |
| 2016/0127247 A1* | 5/2016 | Anzai | H04L 47/283 370/230 |
| 2018/0115490 A1* | 4/2018 | Kawasaki | H04L 47/2441 |

OTHER PUBLICATIONS

Yang et al, Two Different Schemes of Authentication in IEEE 802.16j Multi-Hop Relay Network, IEEE, Sep. 23, 2012, pp. 1-4. (Year: 2012).*

International Search Report and Written Opinion dated Jul. 17, 2018 for PCT/JP2018/019329 filed on May 18, 2018, 11 pages including English Translation of the International Search Report.

Office Action dated Apr. 13, 2021, in corresponding Japanese patent Application No. 2020-518932, 8 pages.

* cited by examiner

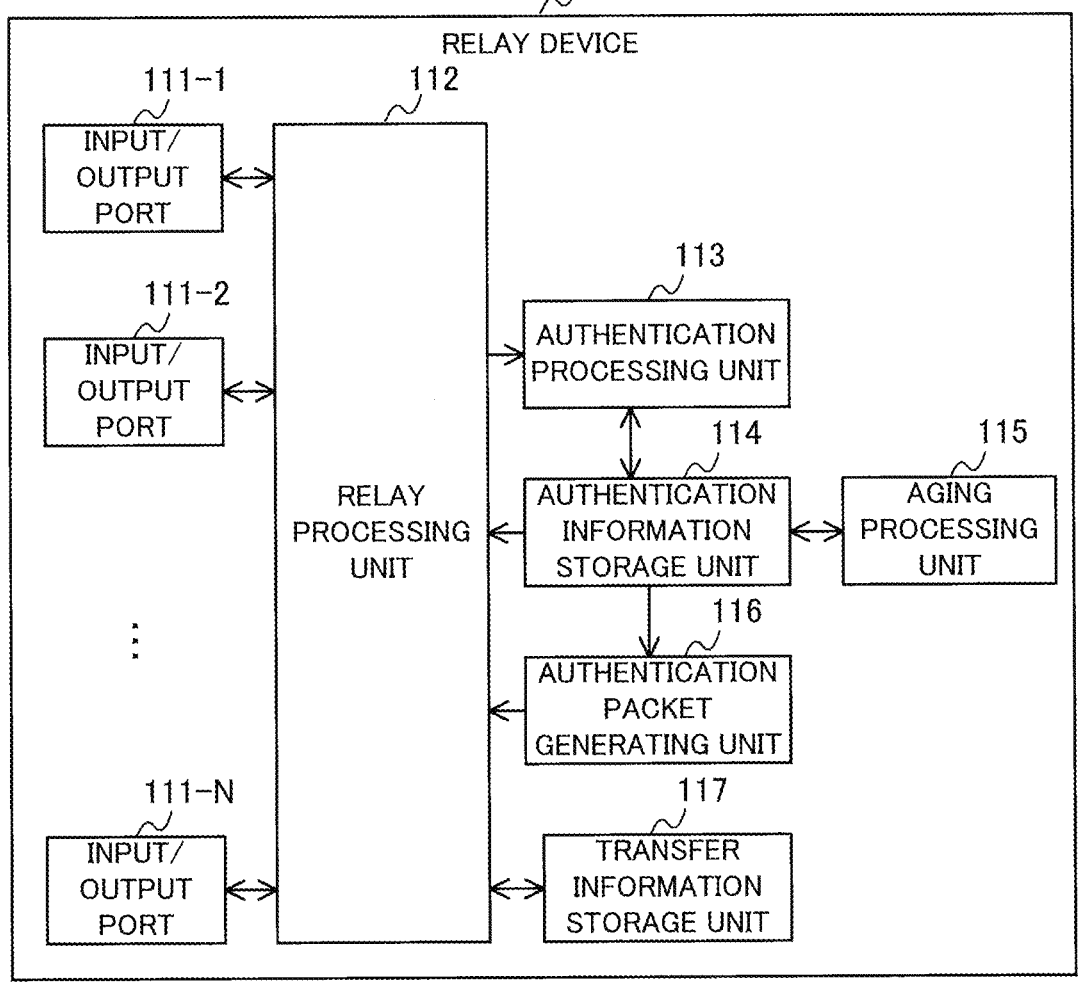

| MAC ADDRESS | INPUT/OUTPUT PORT NUMBER |
|---|---|
| 11-11-11-11-11-11 | 1 |
| 22-22-22-22-22-22 | 2 |
| 33-33-33-33-33-33 | 3 |
| 44-44-44-44-44-44 | 4 |
| 55-55-55-55-55-55 | 5 |
| 66-66-66-66-66-66 | 6 |
| 77-77-77-77-77-77 | 7 |
| ⋮ | ⋮ |
| aa-aa-aa-aa-aa-aa | Disable |

FIG. 12

| ENTRY | DEVICE DATA |
|---|---|
| 1 | 11-11-11-11-11-11 |
| 2 | 22-22-22-22-22-22 |
| ⋮ | ⋮ |
| N | aa-aa-aa-aa-aa-aa |

FIG. 16

| INPUT/OUTPUT PORT NUMBER | AUTHENTICATION DATA | AUTHENTICATION SETTING | VALID | HIT | DELAY CALCULATION SETTING | TRANSFER DELAY PERIOD |
|---|---|---|---|---|---|---|
| 1 | 11-11-11-11-11-11 | Enable | 1 | 1 | Enable | 450-550 $\mu$s |
| 2 | 22-22-22-22-22-22 | Enable | 1 | 0 | Enable | 180-220 $\mu$s |
| 3 | 33-33-33-33-33-33 | Enable | 0 | 0 | Disable | - |
| ... | ... | ... | ... | ... | ... | ... |
| N | aa-aa-aa-aa-aa-aa | Disable | 0 | 0 | Enable | - |

FIG. 22

| INPUT/OUTPUT PORT NUMBER | AUTHENTICATION DATA | AUTHENTICATION SETTING | VALID | HIT | PACKET LENGTH DETERMINATION SETTING | PACKET LENGTH |
|---|---|---|---|---|---|---|
| 1 | 11-11-11-11-11-11 | Enable | 1 | 1 | Enable | 100byte |
| 2 | 22-22-22-22-22-22 | Enable | 1 | 0 | Enable | 1518byte |
| 3 | 33-33-33-33-33-33 | Enable | 0 | 0 | Disable | - |
| ... | ... | ... | ... | ... | ... | ... |
| N | aa-aa-aa-aa-aa-aa | Disable | 0 | 0 | Disable | - |

RELAY DEVICE AND COMMUNICATION SYSTEM

CROSS-REFERENCE TO RELATED APPLICATION

The present application is based on PCT filing PCT/JP2018/019329, filed May 18, 2018, the entire contents of which are incorporated herein by reference.

TECHNICAL FIELD

The present invention relates to a relay device and a communication system.

BACKGROUND ART

In the Local Area Network (LAN), a packet relay device such as a switching hub or a router is used to relay data packets. Examples of typical packet relay devices include switching hubs meeting Ethernet (registered trade mark) or routers meeting Internet Protocol (IP), and authenticate the connected terminal devices by IEEE 802.1X or Media Access Control (MAC) address authentication, among others, to ensure the security of the network (see, for example, Patent reference 1).

PRIOR ART REFERENCE

Patent Reference

Patent reference 1: Japanese Patent Application Publication No. 2001-186186

SUMMARY OF THE INVENTION

Problem to be Solved by the Invention

A conventional packet relay device ensures security between a relay device and a device connected to a port to which authentication such as an IEEE 802.1X or MAC address is set. Therefore, authentication processing setting is not established between the relay devices, and thus authentication processing is not performed therebetween. For this reason, there has been a problem that security cannot be ensured between ports of the relay devices and it is difficult to ensure the security of the entire network.

In addition, there is also a method of creating a white list from a MAC address or the like and performing authentication in order to ensure the security of the entire network including relay devices. However, in this method, there are a problem in which functional addition to the relay devices used in a large network should be done on such a large scale that costs increase, and a problem in which adding a new device requires updating of the white list in the entire network.

It is therefore an object of one or more aspects of the present invention to ensure security between packet relay devices and to ensure security of the entire network.

Means of Solving the Problem

A relay device according to one aspect of the present invention includes: a plurality of input/output ports each of which is connected to each of a plurality of devices including a plurality of relay devices; an authentication information storage unit to store authentication information used for performing authentication of a target relay device which is a relay device to be authenticated in the plurality of relay devices; an authentication processing unit to acquire a target authentication packet via a target input/output port and to perform the authentication of the target relay device by referring to the authentication information, the target authentication packet being an authentication packet used for performing the authentication of the target relay device, the target input/output port being an input/output port connected to the target relay device in the plurality of input/output ports, and a relay processing unit to cause a transfer input/output port to output a transfer packet acquired via the target input/output port when the authentication of the target relay device is succeeded, and to discard the transfer packet when the authentication of the target relay device is failed, the transfer input/output port being an input/output port to which a transfer destination of the transfer packet is connected in the plurality of input/output ports.

A communication system according to one aspect of the present invention is a communication system including a plurality of relay devices, wherein one relay device of the plurality of relay devices comprises: a plurality of input/output ports each of which is connected to each of a plurality of devices including the plurality of relay devices except the one relay device; an authentication information storage unit to store authentication information used for performing authentication of a target relay device which is a relay device to be authenticated in the plurality of relay devices; an authentication processing unit to acquire a target authentication packet via a target input/output port, and to perform the authentication of the target relay device by referring to the authentication information, the target authentication packet being an authentication packet used for performing authentication of the target relay device, the target input/output port being an input/output port connected to the target relay device in the plurality of input/output ports; a relay processing unit to cause a transfer input/output port to output a transfer packet acquired via the target input/output port when the authentication of the target relay device is succeeded, and to discard the transfer packet when the authentication of the target relay device is failed, the transfer input/output port being an input/output port to which a transfer destination of the transfer packet is connected in the plurality of input/output ports; and an authentication packet generating unit to generate a transmission authentication packet which is an authentication packet to be authenticated at the target relay device, and to send the transmission authentication packet to the target relay device via the target input/output port.

Effects of the Invention

One aspect of the present invention can ensure the security among packet relay devices and the security of the entire network.

BRIEF DESCRIPTION OF THE DRAWINGS

FIG. 2 is a block diagram schematically illustrating a configuration of a relay device according to Embodiment 1.

FIG. 3 is a schematic diagram illustrating an example of authentication information according to Embodiment 1.

FIG. 12 is a schematic diagram illustrating an example of query information.

FIG. 16 is a schematic diagram illustrating an example of authentication information according to Embodiment 3.

FIG. 22 is a schematic diagram illustrating an example of authentication information according to Embodiment 4.

MODE FOR CARRYING OUT THE INVENTION

Embodiment 1

Figure 1:
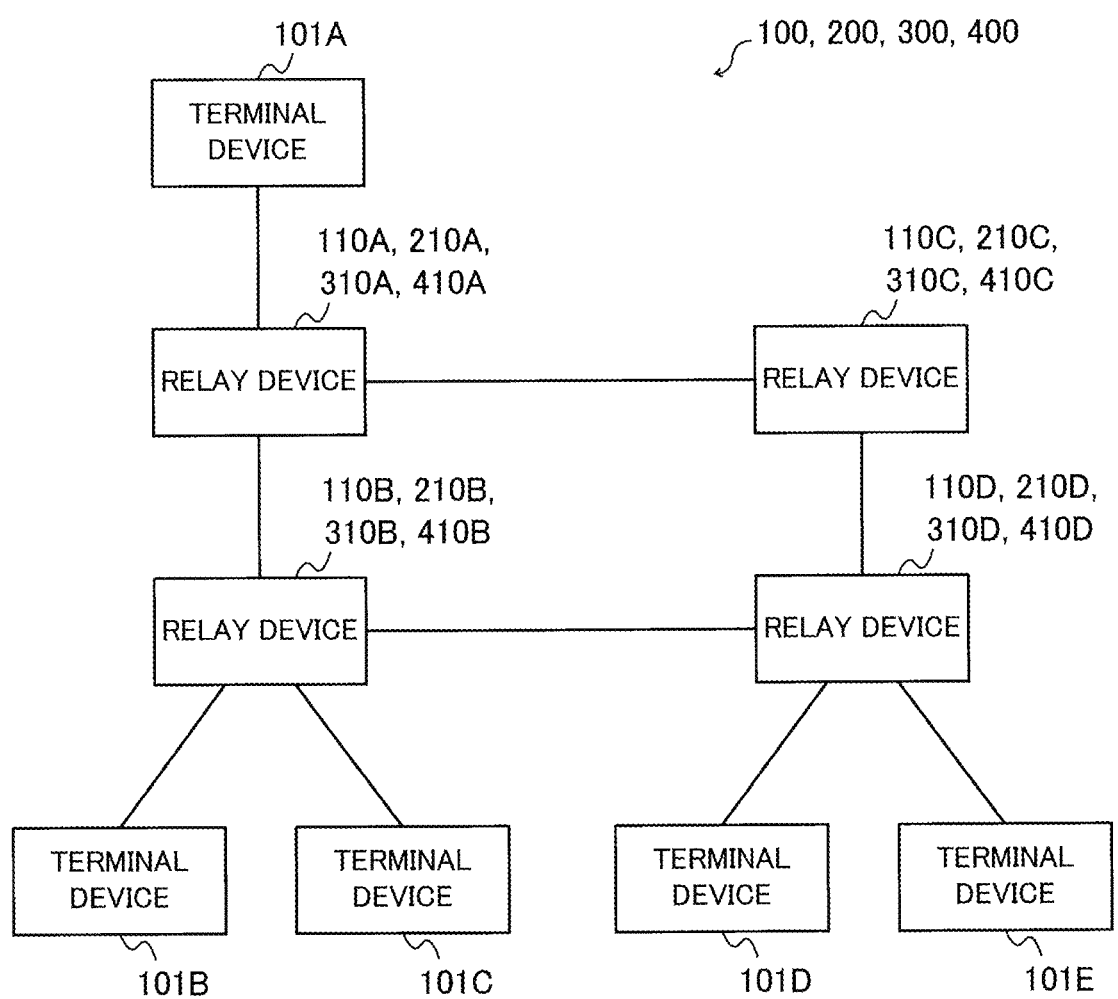
FIG. 1 is a block diagram schematically illustrating a configuration of a communication system according to Embodiments 1 to 4.

FIG. 1 is a block diagram schematically illustrating a configuration of a communication system 100 according to Embodiment 1.

The communication system 100 includes a plurality of relay devices 110A to 110D.

Because each of the plurality of relay devices 110A to 110D is configured similarly, when it is not necessary to particularly distinguish each of the plurality of relay devices 110A to 110D, each of the relay devices is referred to as a relay device 110.

The terminal devices 101A to 101E functioning as information processing devices perform communication via the relay devices 110. For example, when a packet is transferred from the terminal device 101A to the terminal device 101B, the packet is sent to the terminal device 101B via the relay device 110A and the relay device 110B.

When it is not necessary to particularly distinguish each of the terminal devices 101A to 101D, each of the terminal devices 101A to 101D is referred to as a terminal device 101.

FIG. 2 is a block diagram schematically illustrating a configuration of the relay device 110.

The relay device 110 includes a plurality of input/output ports 111-1 to 111-N (N is an integer equal to or greater than 2), a relay processing unit 112, an authentication processing unit 113, an authentication information storage unit 114, an aging processing unit 115, an authentication packet generating unit 116, and a transfer information storage unit 117.

These components are connected so that signal data can be input and output in one direction or in both directions.

When it is not necessary to particularly distinguish each of the plurality of input/output ports 111-1 to 111-N, each of the plurality of input/output ports 111-1 to 111-N is referred to as an input/output port 111.

The input/output port 111 is connected to another relay device 110 or the terminal device 101 to transmit and receive packets. When receiving a packet from another relay device 110 or a terminal device 101, the input/output port 111 sends the packet to the relay processing unit 112.

The relay processing unit 112 transfers the packet from the input/output port 111 or the authentication packet generating unit 116 according to authentication information stored in the authentication information storage unit 114 and transfer information stored in the transfer information storage unit 117. Here, when another relay device 110 connected to the input/output port 111 is to perform authentication, if the authentication of the relay device 110 is succeeded, the relay processing unit 112 transfers the transfer packets obtained from the relay device 110, which are packets other than the authentication packet, or if the authentication of the relay device 110 is failed, the relay processing unit 112 discards the transfer packets obtained from the relay device 110.

When acquiring the authentication packet from the input/output port 111, the relay processing unit 112 transfers the authentication packet to the authentication processing unit 113.

Upon acquiring the authentication packet from the relay processing unit 112, the authentication processing unit 113 refers to the authentication information stored in the authentication information storage unit 114 to authenticate another relay device 110. For example, the authentication processing unit 113 compares the authentication data included in the authentication packet with the authentication data included in the authentication information to authenticate another relay device 110.

The authentication processing unit 113 also has a function of editing the authentication information stored in the authentication information storage unit 114.

The authentication information storage unit 114 stores authentication information for performing authentication of another relay device 110.

FIG. 3 is a schematic diagram illustrating an authentication data table 114a as an example of the authentication information according to Embodiment 1.

The authentication data table 114a includes an input/output port number column 114b, an authentication data column 114c, an authentication setting column 114d, a VALID column 114e, and a HIT column 114f, and each row is an entry for storing data for authenticating each relay device 110.

The input/output port number column 114b stores an input/output port number as input/output port identification information for identifying the input/output port 111. Each of the input/output ports 111-1 to 111-N is assigned a unique input/output port number in advance.

The authentication data column 114c stores authentication data used for the authentication of a relay device 110. For example, any one of a MAC address, an IP address, Organization Unique Identifier (OUI), and arbitrary data may be used as the authentication data. It should be noted that the authentication data stored in the authentication data column 114c is also referred to as comparison authentication data.

The authentication setting column 114d stores an authentication setting indicating whether or not to authenticate the relay device 110. If the authentication setting is "Enable", authentication is performed, and if the authentication setting is "Disable", authentication is not performed.

The VALID column 114e stores a value of VALID, which is a first flag indicating whether the authentication of the relay device 110 has been succeeded. If the value of VALID is "1", which is a first value, it indicates that the authentication has been succeeded, and if the value of VALID is "0", which is a second value, it indicates that the authentication has been failed.

The HIT column 114f stores a value of HIT, which is a second flag indicating whether the authentication packet that has been successfully authenticated was received from the relay device 110 within an aging timer. If the value of HIT is "1", which is a third value, it indicates that such an authentication packet has been received, and if the value of HIT is "0", which is a fourth value, it indicates that such an authentication packet has not been received.

As described above, in the authentication data table 114a, the input/output port number, the authentication data, the authentication setting, the value of VALID, and the value of HIT are associated with each other.

It should be noted that, in the authentication data table 114a, the input/output port 111 indicated by the input/output port number having the authentication setting of "Enable" is also referred to as a target input/output port, and the relay device 110 connected to the target input/output port is also referred to as a target relay device. The authentication packet from the target relay device is also referred to as a target authentication packet. The input/output port 111 to which a transfer destination of a transfer packet from the target relay device is connected is also referred to as a transfer input/output port.

To return to FIG. 2, the aging processing unit 115 manages, as an aging timer, a period until the value of VALID or HIT of the authentication data table 114a is updated. For example, the aging timer may be from 1 to 10 seconds.

Each time the aging timer expires, the aging processing unit 115 sequentially reads the entries in the authentication data table 114a and updates all the entries.

The authentication packet generating unit 116 manages, as a transmission timer, a period until the authentication packet is transmitted. The transmission timer is set to be shorter than the aging timer.

The authentication packet generating unit 116 generates an authentication packet every time a transmission timer expires and supplies the authentication packet to the relay processing unit 112. The authentication packet generated by the authentication packet generating unit 116 is also referred to as a transmission authentication packet.

Figures 4, 5:
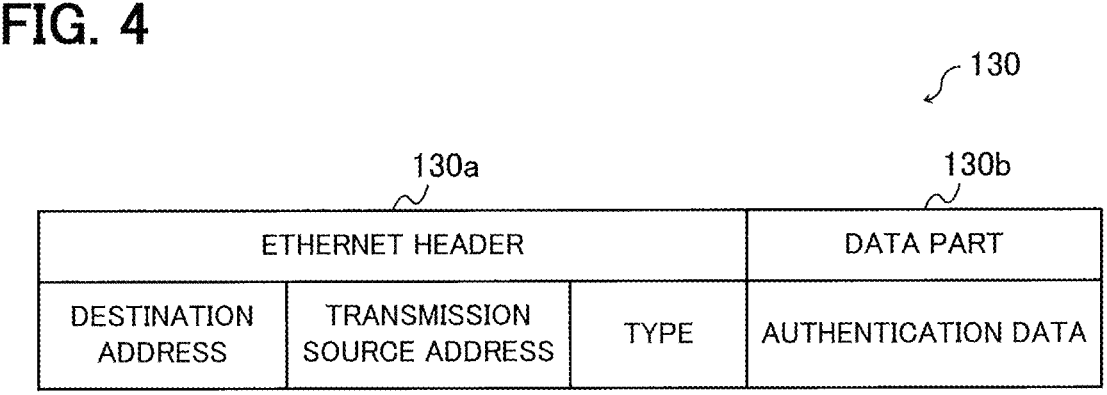
FIG. 4 is a schematic diagram illustrating an example format of an authentication packet according to Embodiment 1.
FIG. 5 is a schematic diagram illustrating an example of transfer information according to Embodiment 1.

FIG. 4 is a schematic diagram illustrating an example of the format of the authentication packet 130.

The authentication packet 130 includes an Ethernet header 130a and a data part 130b.

The Ethernet header 130a holds a destination address, a transmission source address, and a type.

The data part 130b holds authentication data.

In the type of the Ethernet header 130a or the data part 130b, a value indicating that the packet is the authentication packet 130 is set.

The authentication packet 130 may be encrypted by Advanced Encryption Standard (AES) or the like.

To return to FIG. 2, the transfer information storage unit 117 stores transfer information for transferring a packet from the input/output port 111.

FIG. 5 is a schematic diagram illustrating a transfer table 117a as an example of the transfer information.

The transfer table 117a includes a MAC address column 117b and an input/output port number column 117c, and each row is an entry for storing data for transferring a packet.

The MAC address column 117b stores a MAC address which is the communication address of a relay device 110.

The input/output port number column 117c stores the input/output port number of the input/output port 111 to which the relay device 110 is connected.

In the transfer table 117a, the MAC address is associated with the input/output port number.

Figure 6A:
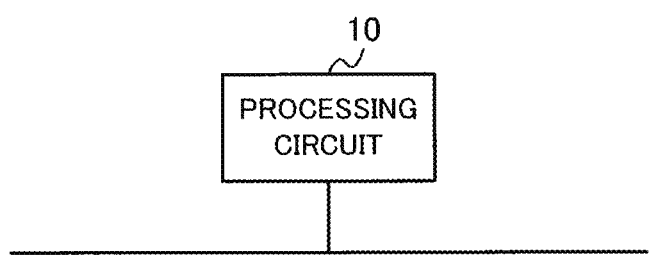
FIGS. 6A and 6B are block diagrams illustrating examples of hardware configurations.

Part or all of the relay processing unit 112, the authentication processing unit 113, the aging processing unit 115, and the authentication packet generating unit 116 described above can be implemented by a processing circuit 10 as shown in FIG. 6A such as a single circuit, a composite circuit, a programmed processor, a parallel programmed processor, an Application Specific Integrated Circuits (ASIC) or a Field Programmable Gate Array (FPGA).

Figure 6B:
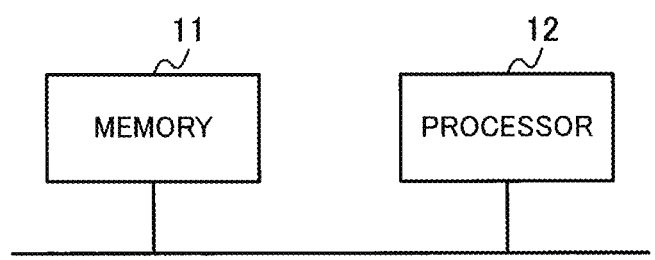

Further, as shown in FIG. 6B, for example, part of the relay processing unit 112, the authentication processing unit 113, the aging processing unit 115, and the authentication packet generating unit 116 may be implemented by a memory 11 and a processor 12 such as a Central Processing Unit (CPU) which executes a program stored in the memory 11. Such a program may be provided via a network or by a recording medium recording the program. In other words, such a program may be provided as a program product, for example.

It should be noted that the authentication information storage unit 114 and the transfer information storage unit 117 can be implemented by a volatile or nonvolatile memory.

Figure 7:
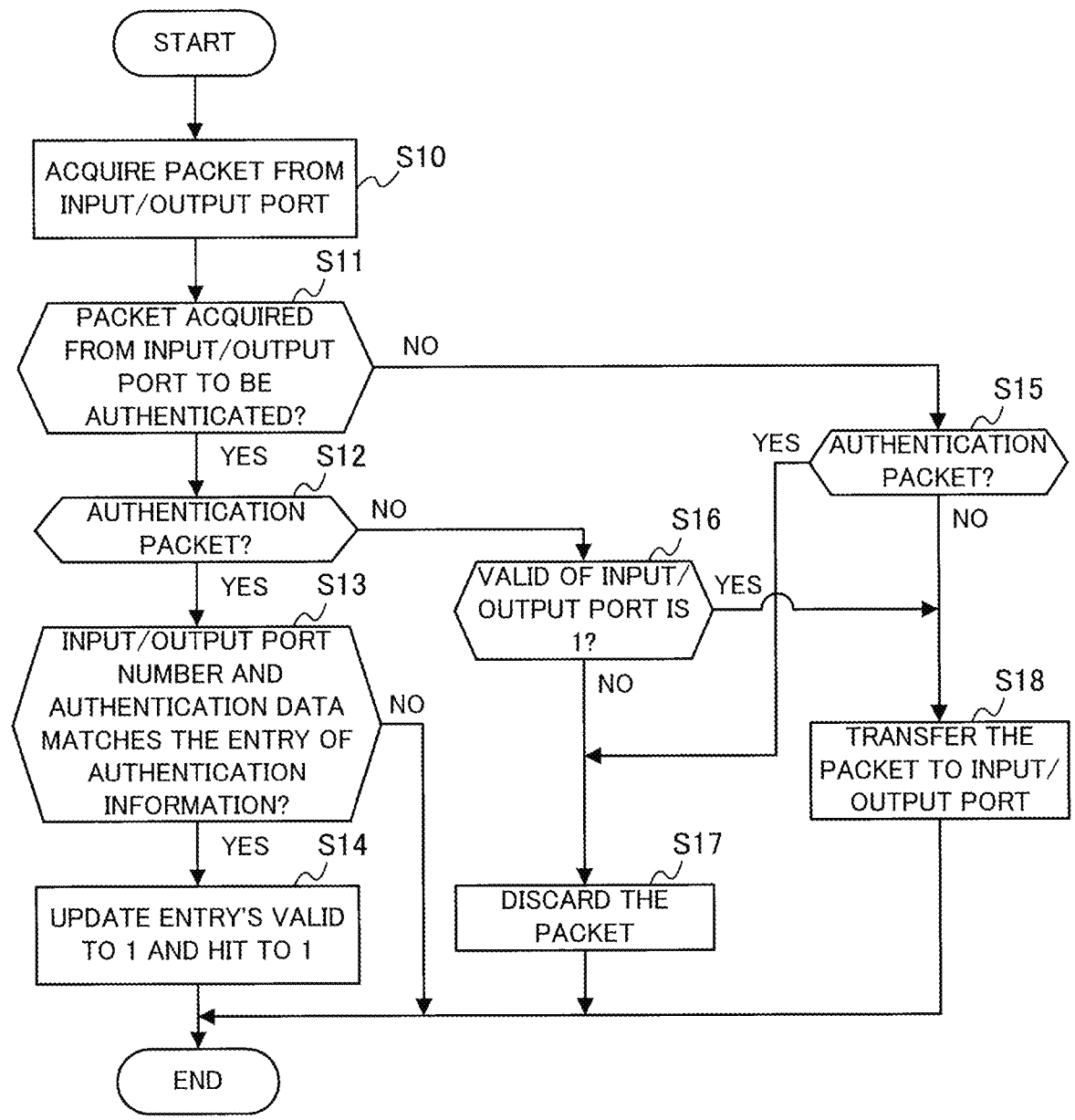
FIG. 7 is a flowchart indicating an authentication operation of a relay device according to Embodiment 1.

FIG. 7 is a flowchart indicating an authentication operation of the relay device 110 according to Embodiment 1.

It is assumed that the authentication processing unit 113 of the relay device 110 has set the input/output port number, the authentication data, and "Enable" or "Disable" of the authentication setting for each entry of the authentication data table 114a stored in the authentication information storage unit 114.

The flowchart of FIG. 7 starts when the input/output port 111 receives a packet.

First, the relay processing unit 112 acquires the packet from the input/output port 111 that has received the packet (S10).

Next, the relay processing unit 112 refers to the authentication data table 114a to determine whether the authentication setting of the entry corresponding to the input/output port 111 that has received the packet is "Enable" (S11). In other words, it is determined whether the relay device 110 connected to the input/output port 111 that has received the packet is a relay device to be authenticated. If it is "Enable" (Yes in S11), the process proceeds to step S12, and if it is not "Enable" but "Disable" (No in S11), the process proceeds to step S15.

In step S12, the relay processing unit 112 determines whether the packet acquired in step S11 is the authentication packet 130. For example, the relay processing unit 112 may make this determination based on whether a value indicating the authentication packet 130 is set in the type of the Ethernet header 130a or the data part 130b. If the packet is the authentication packet 130 (Yes in S12), the relay processing unit 112 sends the authentication packet 130 to the authentication processing unit 113, notifies the authentication processing unit 113 of the input/output port number of the input/output port 111 that received the authentication packet 130, and the process proceeds to step S13. If the packet is not the authentication packet 130 (No in S12), the process proceeds to step S16.

In step S13, the authentication processing unit 113 refers to the authentication data table 114a stored in the authentication information storage unit 114 to determine whether the authentication data of the entry corresponding to the input/output port number which the relay processing unit 112 notifies the authentication processing unit 113 of matches the authentication data held in the authentication packet 130 supplied from the relay processing unit 112 (S13). If they match, it is determined that the authentication of the relay device 110 that has sent the authentication packet 130 is succeeded, and the process proceeds to step S14. If they do not match, the process ends.

In step S14, the authentication processing unit 113 updates the value of VALID of the entry corresponding to the input/output port number which the relay processing unit 112 notifies the authentication processing unit 113 of to "1" and the value of HIT to "1".

In step S15, the relay processing unit 112 determines whether the packet acquired in step S11 is the authentication packet 130. If the packet is the authentication packet 130 (Yes in S15), the process proceeds to step S17, and the relay processing unit 112 discards the packet. If the packet is not the authentication packet 130 (No in S15), the process proceeds to step S18, and since the packet is a normal packet (transfer packet) from the relay device 110, the relay processing unit 112 refers to the transfer table 117a stored in the transfer information storage unit 117 to transfer the packet to the input/output port 111 corresponding to the destination of the packet.

In step S16, the relay processing unit 112 refers to the authentication data table 114a stored in the authentication information storage unit 114 to determine whether the value of VALID of the entry corresponding to the input/output port 111 that has received the packet is "1", in other words, whether the authentication of the relay device 110 that has transmitted the packet is succeeded. If the value is not "1" but "0" (No in S16), since it is indicated that the authentication of the relay device 110 has been failed, the process proceeds to step S17, and the relay processing unit 112 discards the packet. If the value is "1" (Yes in S16), since it is indicated that the authentication of the relay device 110 has been succeeded, the process proceeds to step S18 and the relay processing unit 112 refers to the transfer table 117a stored in the transfer information storage unit 117 to transfer the packet to the input/output port 111 corresponding to the destination of the packet.

Figure 8:
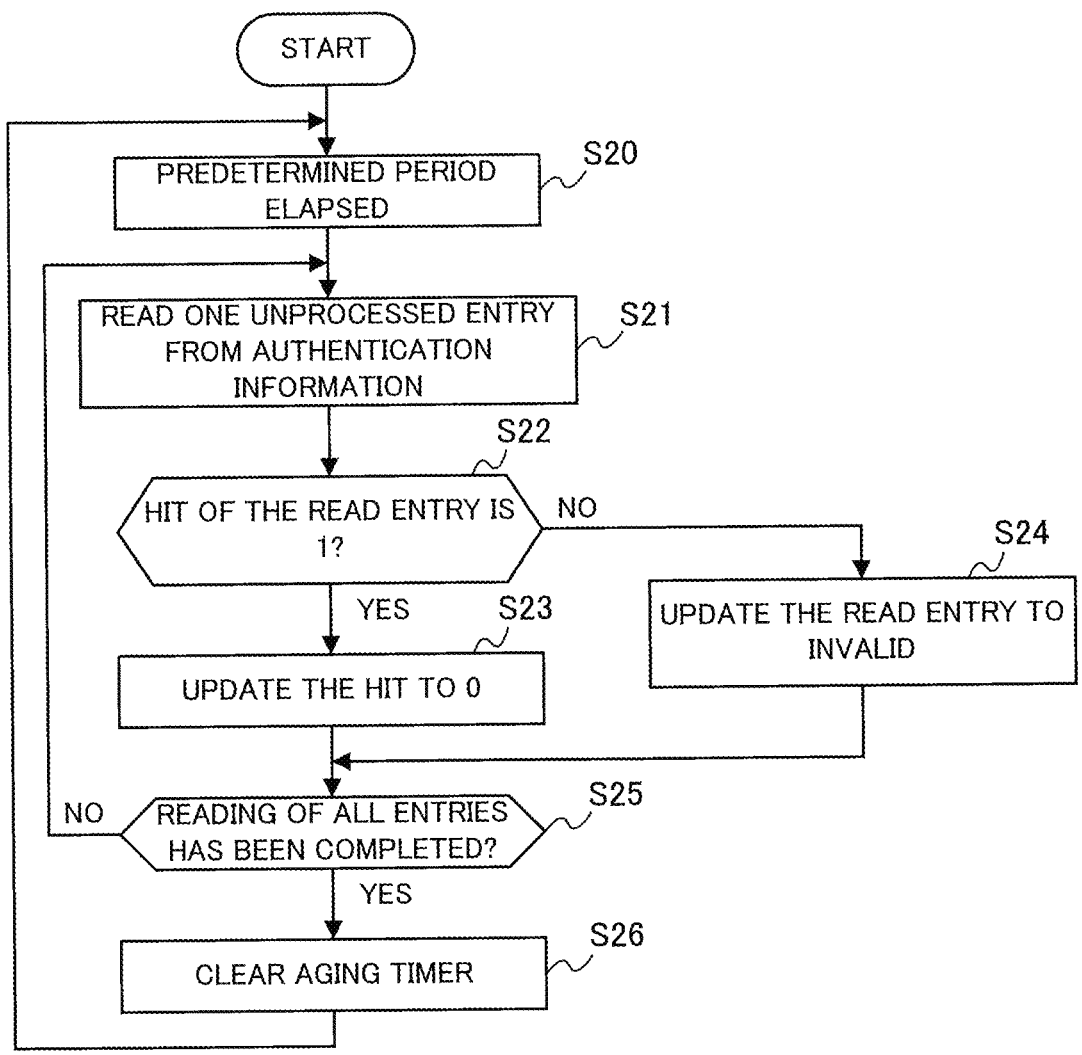
FIG. 8 is a flowchart indicating an update operation of an entry in an authentication data table.

FIG. 8 is a flowchart indicating an update operation of an entry in the authentication data table 114a.

The aging processing unit 115 starts the update operation of the entry at the timing when the aging timer held by the aging processing unit 115 expires, or in other words, at the timing when a predetermined aging update standby period elapses (S20).

The aging processing unit 115 reads one entry that has not yet been updated from the entries of the authentication data table 114a (S21).

Next, the aging processing unit 115 determines whether the value of HIT of the entry read in step S21 is "1", in other words, whether the relay device 110 corresponding to the read entry has sent the authentication packet 130 that has been successfully authenticated within a predetermined time period corresponding to the aging timer (S22). If the value is "1" (Yes in S22), the process proceeds to step S23, and if the value is not "1" but "0" (No in S22), the process proceeds to step S24.

In step S23, the aging processing unit 115 updates the value of HIT of the entry read in step S21 to "0". Then, the process proceeds to step S25.

On the other hand, in step S24, the aging processing unit 115 updates the value of VALID of the entry to "0" so that the entry read in step S21 becomes invalid. Then, the process proceeds to step S25.

In step S25, the aging processing unit 115 determines whether the reading of the entries in the authentication data table 114a is completed. If all of the entries have been read (Yes in S25), the process proceeds to step S26, and if there is any entry that has not been read yet (No in S25), the process returns to step S21.

In step S26, the aging processing unit 115 clears the aging timer and measures the predetermined aging update standby period again.

Figure 9:
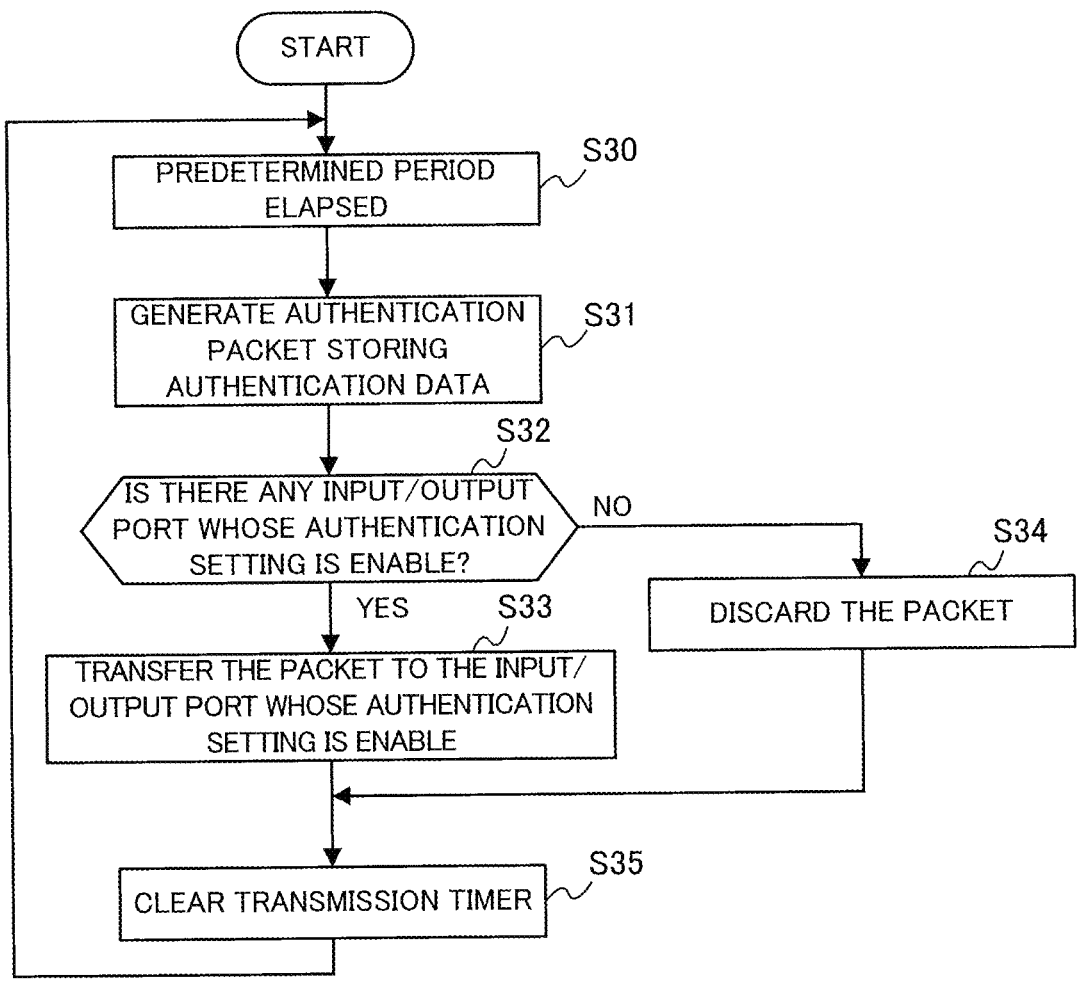
FIG. 9 is a flowchart indicating an operation of a relay device according to Embodiment 1 to transmit an authentication packet.

FIG. 9 is a flowchart indicating an operation of the relay device 110 to transmit the authentication packet 130.

The authentication packet generating unit 116 starts the transmission operation of the authentication packet 130 at the timing when the transmission timer held by the authentication packet generating unit 116 expires, in other words, at the timing when a predetermined transmission standby period elapses (S30).

The authentication packet generating unit 116 generates the authentication packet 130 holding authentication data in the data part 130b, and sends the authentication packet 130 to the relay processing unit 112 (S31).

After acquiring the authentication packet 130 from the authentication packet generating unit 116, the relay processing unit 112 refers to the authentication data table 114a stored in the authentication information storage unit 114 to determine whether there is an entry whose authentication setting is "Enable", in other words, there is an entry corresponding to a relay device to be authenticated (S32). If there is an entry whose authentication setting is "Enable" (Yes in S32), the process proceeds to step S33, and if there is no entry whose authentication setting is "Enable" (No in S32), the process proceeds to step S34.

In step S33, the relay processing unit 112 transfers the authentication packet 130 to the input/output port 111 corresponding to the input/output port number of the entry whose authentication setting is "Enable", and causes the input/output port 111 to transmit the authentication packet 130 to the relay device 110. Then, the process proceeds to step S35.

In step S34, the relay processing unit 112 discards the acquired authentication packet 130. Then, the process proceeds to step S35.

In step S35, the authentication packet generating unit 116 clears the transmission timer and measures the predetermined transmission standby period again.

As described above, according to Embodiment 1, by performing authentication processing between the relay devices 110, successfully authenticated packets of the input/output ports 111 can be transferred and unauthorized use of the network is prevented, thereby improving the security of the network.

Further, the relay device 110 according to Embodiment 1 can avoid a packet transfer disable period by using two flags of VALID and HIT.

Embodiment 1 is not limited to the relay device 110, and can be applied to any device that transmits packets.

Embodiment 2

In Embodiment 1, an authentication operation based on an entry in the authentication data table 114a of the relay device 110 is described and, in Embodiment 2, an example in which another device performs authentication when there is no corresponding entry in the authentication data table 114a will be described.

As shown in FIG. 1, the communication system 200 according to Embodiment 2 includes a plurality of relay devices 210A to 210D.

Since each of the plurality of relay devices 210A to 210D is configured similarly, when it is not necessary to particularly distinguish each of the plurality of relay devices 210A to 210D, each of the relay devices 210A to 210D is referred to as a relay device 210.

Also in Embodiment 2, the terminal devices 101A to 101E perform communication via the relay devices 210.

Figure 10:
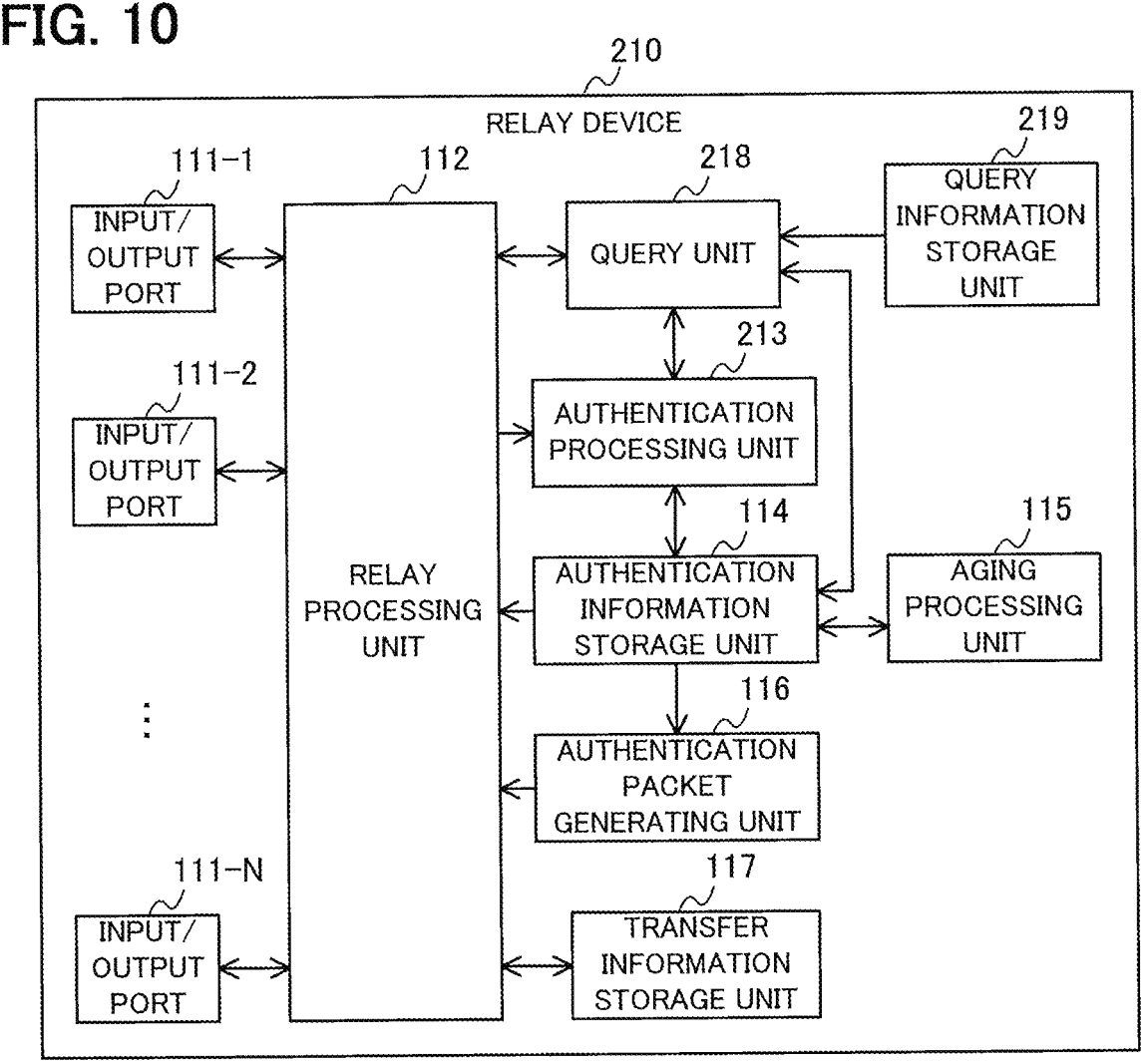
FIG. 10 is a block diagram schematically illustrating a configuration of a relay device according to Embodiment 2.

FIG. 10 is a block diagram schematically illustrating a configuration of the relay device 210.

The relay device 210 includes a plurality of input/output ports 111, a relay processing unit 112, an authentication processing unit 213, an authentication information storage unit 114, an aging processing unit 115, an authentication packet generating unit 116, a transfer information storage unit 117, a query unit 218, and a query information storage unit 219.

The input/output port 111, the relay processing unit 112, the authentication information storage unit 114, the aging processing unit 115, the authentication packet generating unit 116, and the transfer information storage unit 117 of the relay device 210 in Embodiment 2 are the same as the input/output port 111, the relay processing unit 112, the authentication information storage unit 114, the aging processing unit 115, the authentication packet generating unit 116, and the transfer information storage unit 117 of the relay device 110 in Embodiment 1.

When acquiring the authentication packet 130 from the relay processing unit 112, the authentication processing unit 213 authenticates another relay device 210 by using the authentication information stored in the authentication information storage unit 114.

Here, if the authentication processing unit 213 fails authentication of another relay device 210, in other words, if the authentication data table 114a has no entry corresponding to the input/output port number of the input/output port 111 that received the authentication packet 130 and the authentication data included in the authentication packet 130, the authentication processing unit 213 sends the authentication data to the query unit 218 and requests a query.

In response to the request from the authentication processing unit 213, the query unit 218 refers to the query information stored in the query information storage unit 219, and queries the authentication data to another relay device 210. More specifically, the query unit 218 sends a query packet to another relay device 210 via the relay processing unit 112 and the input/output port 111, to query the authentication data. Thus, the query unit 218 queries, to another relay device 210, the authentication of the relay device 210 whose authentication has been failed in its own device.

Figure 11:
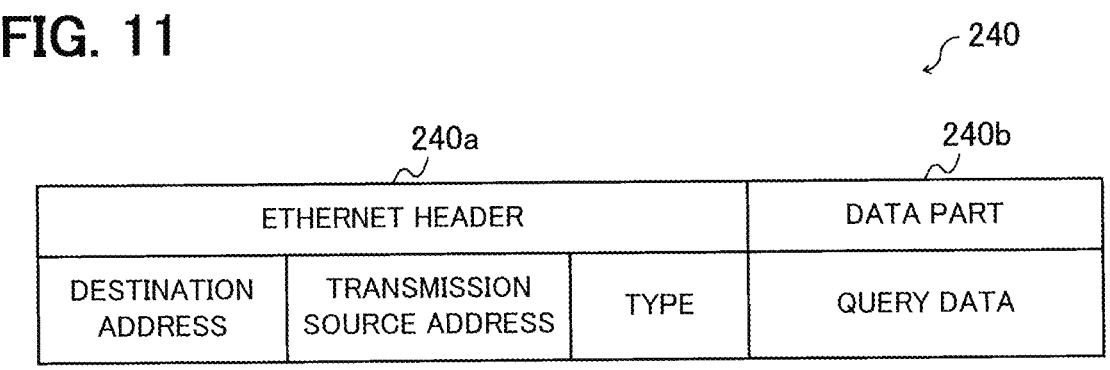
FIG. 11 is a schematic diagram illustrating an example of query packet format.

FIG. 11 is a schematic diagram illustrating an example format of the query packet 240.

The query packet 240 holds an Ethernet header 240a and a data part 240b.

The Ethernet header 240a holds a destination address, a transmission source address, and a type.

The data part 240b holds authentication data to be a target of a query.

In the type of the Ethernet header 240a or the data part 240b, a value indicating that the packet is the query packet 240 is set.

Then, the query unit 218 edits an entry of the authentication data table 114a stored in the authentication information storage unit 114 according to the result of the query. As a result, the relay processing unit 112 can transfer the transfer packet from the relay device 210 which has been successfully authenticated by another device, even if its own device fails the authentication.

In addition, the query unit 218 has a function of storing, in the query information stored in the query information storage unit 219, device data of another relay device 210 to which a query is to be made.

The query information storage unit 219 stores query information indicating a relay device 210 as a query destination of authentication data.

FIG. 12 is a schematic diagram illustrating a query table 219a as an example of the query information.

The query table 219a includes an entry column 219b and a device data column 219c, and each row is an entry for storing data indicating a query destination of authentication data.

The entry column 219b stores an entry number which is entry identification information for identifying an entry. As the entry number, for example, sequential numbers are assigned in order from "1".

The device data column 219c stores device data that is relay device identification information for identifying the relay device 210 that is the query destination. The device data may be, for example, at least any one of a MAC address, an IP address, OUI, and arbitrary data.

It is assumed that the entry in the entry column 219b is specified as the query destination in an ascending order from the relay device 210 corresponding to the entry having the lowest entry number.

Some or all of the relay processing unit 112, the authentication processing unit 213, the aging processing unit 115, the authentication packet generating unit 116, and the query unit 218 described above can be implemented by the processing circuit 10 as shown in FIG. 6A, for example.

Further, as shown in FIG. 6B, for example, a part of the relay processing unit 112, the authentication processing unit 213, the aging processing unit 115, the authentication packet generating unit 116, and the query unit 218 may be implemented by the memory 11 and the processor 12 for executing the program stored in the memory 11. Such a program may be provided via a network or by a recording medium recording the program. In other words, such a program may be provided as a program product, for example.

It should be noted that the authentication information storage unit 114, the transfer information storage unit 117, and the query information storage unit 219 can be implemented by a volatile or nonvolatile memory.

Figure 13:
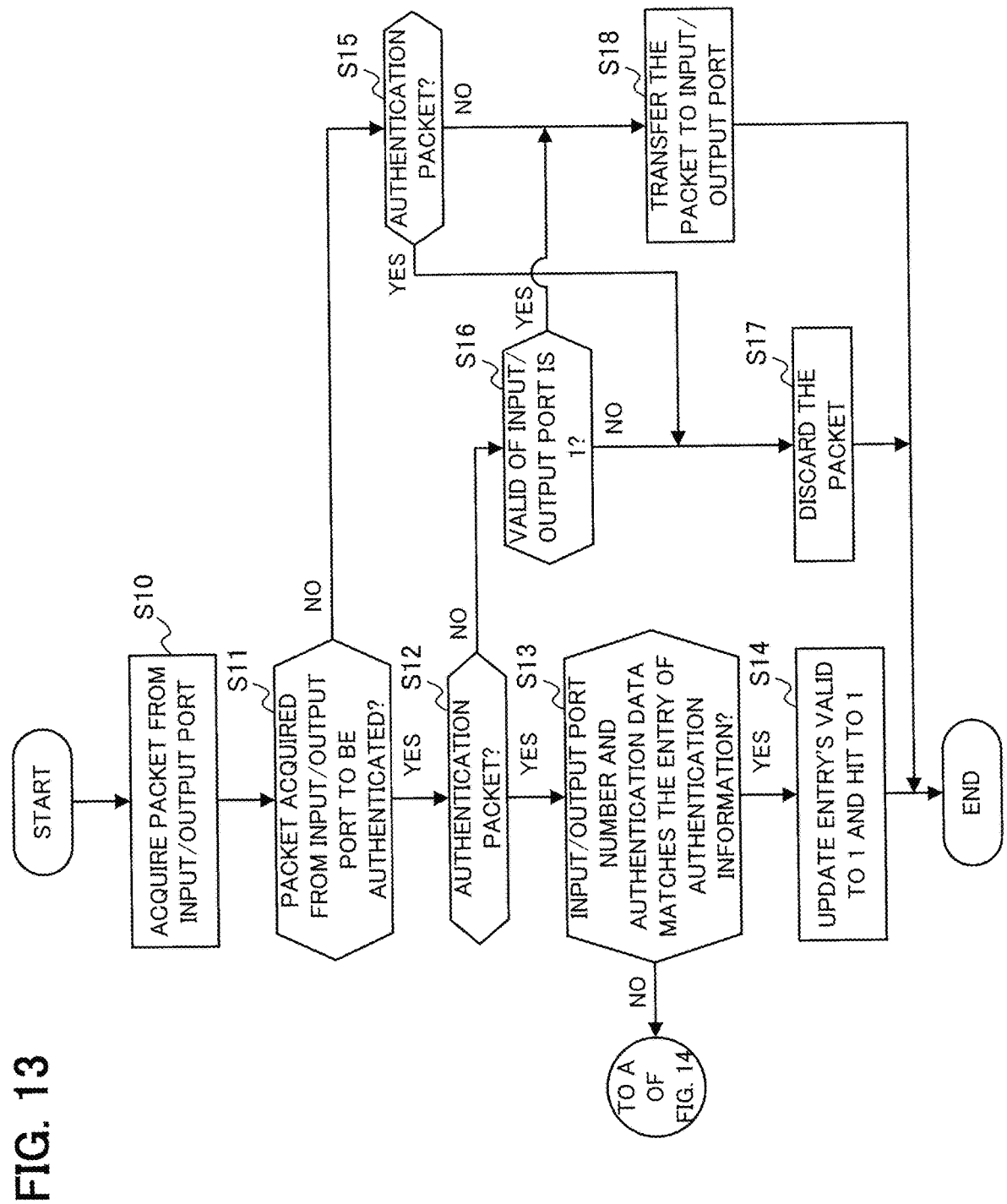
FIG. 13 is a first flowchart indicating an authentication operation of a relay device according to Embodiment 2.
Figure 14:
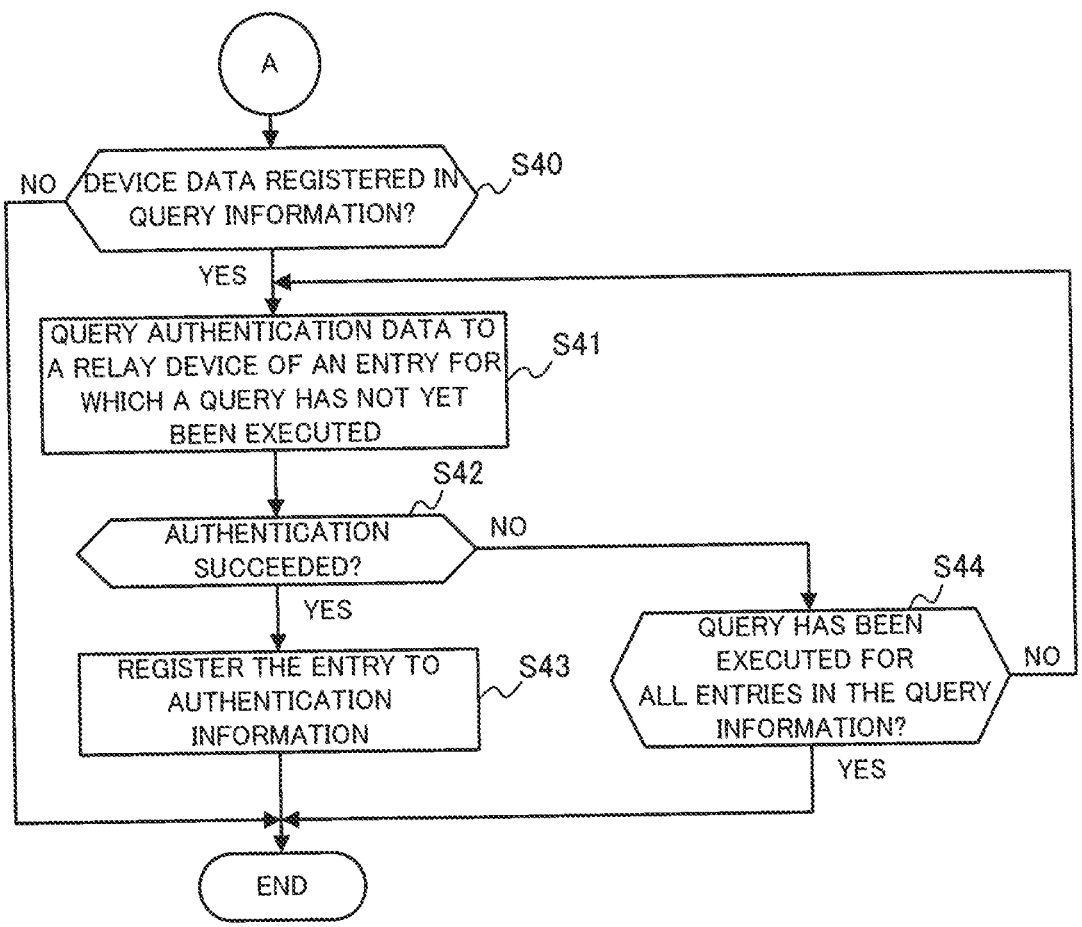
FIG. 14 is a second flowchart indicating an authentication operation of a relay device according to Embodiment 2.

FIGS. 13 and 14 are flowcharts illustrating an authentication operation of the relay device 210 in Embodiment 2.

In the processes of the flowcharts shown in FIGS. 13 and 14, processes similar to those of the flowchart shown in FIG. 7 in Embodiment 1 are denoted by the same reference numerals as those of FIG. 7, and detailed descriptions thereof will be omitted.

The processes of steps S10 to S18 in FIG. 13 is similar to the processes of steps S10 to S18 in FIG. 7.

However, when it is determined to be "No" in step S13 of FIG. 13, in other words, when the authentication data of the entry corresponding to the input/output port number which the relay processing unit 112 notifies the authentication processing unit 213 of does not match the authentication data held in the authentication packet 130 supplied from the relay processing unit 112, the process proceeds to step S40 of FIG. 14. In this case, the authentication processing unit 213 sends the authentication data to the query unit 218 and requests the query.

In step S40 of FIG. 14, the query unit 218 which has received the query request determines whether the device data is registered in the query table 219a stored in the query information storage unit 219. If the device data is registered (Yes in S40), the process proceeds to step S41, and if the device data is not registered (No in S40), the process ends.

In step S41, the query unit 218 refers to the query table 219a and sends the query packet 240 to the relay device 210 indicated by the device data for which the query has not yet been executed via the relay processing unit 112 and the input/output port 111, thereby executing the query.

In the relay device 210 which has received the query packet 240, the query unit 218 determines whether the authentication data matching the authentication data included in the query packet 240 is stored in any entry of the authentication data table 114a stored in the authentication information storage unit 114 of its own device. If such authentication data is stored in any of the entries, the query unit 218 sends a response packet indicating authentication success to the relay device 210 of the query source via the relay processing unit 112 and the input/output port 111. If such authentication data is not stored in any entry, the query unit 218 sends a response packet indicating authentication failure to the relay device 210 of the query source via the relay processing unit 112 and the input/output port 111.

Then, the query unit 218 of the query source determines whether the authentication is succeeded based on the response packet from the query destination (S42). If the authentication is succeeded (Yes in S42), the process proceeds to step S43, and if the authentication is failed (No in S42), the process proceeds to step S44.

In step S43, the query unit 218 specifies, in the authentication data table 114a, an entry corresponding to the input/output port number of the input/output port 111 that received the authentication packet 130 in step S10 of FIG. 13, and stores the authentication data held in the authentication packet 130, the authentication setting "Enable", the value "1" of VALID, and the value "1" of HIT in the specified entry.

In step S44, the query unit 218 determines whether a query has been executed for all entries in the query table 219a. If there is any entry for which a query has not been executed yet (No in S44), the process returns to step S41, and if a query has been executed to all entries (Yes in S44), the process ends.

As described above, according to Embodiment 2, by querying authentication data to another relay device 210, the authentication data table 114a managed individually by each relay device 210 can be integrated into one authentication data table 114a.

It should be noted that, in Embodiment 2, the query destination of the authentication data is another relay device 210; however, a device (not shown) other than the relay device 210 may authenticate the authentication data as long as the device can transmit and receive packets.

Embodiment 3

In Embodiment 1, the authentication operation is performed with the authentication data and, in Embodiment 3, the authentication operation is also performed by synchronizing time and checking a delay of the authentication packet.

As shown in FIG. 1, the communication system 300 according to Embodiment 3 includes a plurality of relay devices 310A to 310D.

Because each of the plurality of relay devices 310A to 310D is configured similarly, when it is not necessary to particularly distinguish each of the plurality of relay devices 310A to 310D, each of the relay devices 310A to 310D is referred to as a relay device 310.

Also in Embodiment 3, the terminal devices 101A to 101E perform communication via the relay devices 310.

Figure 15:
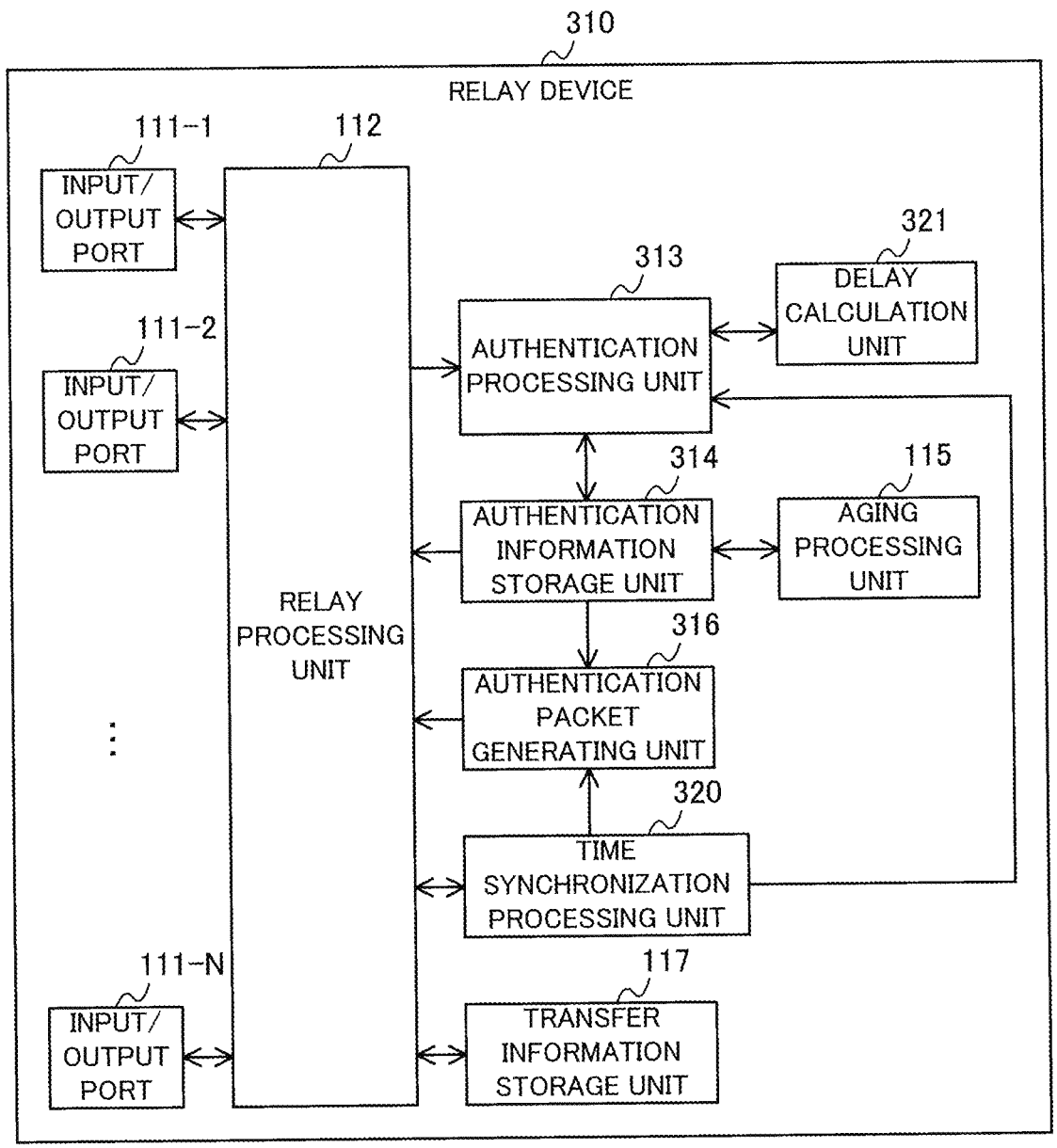
FIG. 15 is a block diagram schematically illustrating a configuration of a relay device according to Embodiment 3.

FIG. 15 is a block diagram schematically illustrating a configuration of the relay device 310.

The relay device 310 includes a plurality of input/output ports 111, a relay processing unit 112, an authentication processing unit 313, an authentication information storage unit 314, an aging processing unit 115, an authentication packet generating unit 316, a transfer information storage unit 117, a time synchronization processing unit 320, and a delay calculation unit 321.

The input/output port 111, the relay processing unit 112, the aging processing unit 115, and the transfer information storage unit 117 of the relay device 310 in Embodiment 3 are the same as the input/output port 111, the relay processing unit 112, the aging processing unit 115, and the transfer information storage unit 117 of the relay device 110 in Embodiment 1.

When acquiring the authentication packet from the relay processing unit 112, the authentication processing unit 313 authenticates another relay device 310 by using the authentication information stored in the authentication information storage unit 314. For example, the authentication processing unit 313 performs authentication with the authentication data in the same way as Embodiment 1, causes the delay calculation unit 321 to calculate a delay of the authentication packet, and performs authentication depending on whether the calculated delay is within a transfer delay period indicating a range of allowable transfer delays stored in the authentication information as well. Specifically, when the authentication packet is acquired from the relay processing unit 112, the authentication processing unit 313 acquires the time from the time synchronization processing unit 320, and transmits the acquired time as the reception time to the delay calculation unit 321 together with the transmission time included in the authentication packet, thereby causing the delay calculation unit 321 to calculate the delay.

Each time the update timer measured by the delay calculation unit 321 expires, the authentication processing unit 313 updates the transfer delay period stored in the authentication data table 314a. For example, the authentication processing unit 313 holds the calculated delay for each input/output port number, and calculates the transfer delay period by using the held delay.

The authentication processing unit 313 also has a function of editing the authentication information stored in the authentication information storage unit 314.

The authentication information storage unit 314 stores authentication information used for performing authentication of another relay device 310.

FIG. 16 is a schematic diagram illustrating an authentication data table 314a as an example of the authentication information in Embodiment 3.

The authentication data table 314a includes an input/output port number column 314b, an authentication data column 314c, an authentication setting column 314d, a VALID column 314e, an HIT column 314f, a delay calculation setting column 314g, and a transfer delay period column 314h, and each row is an entry for storing data for authenticating each relay device 310.

The input/output port number column 314b stores an input/output port number.

The authentication data column 314c stores authentication data used for performing authentication of a relay device 310.

The authentication setting column 314d stores an authentication setting indicating whether or not to authenticate the relay device 310.

The VALID column 314e stores the value of VALID.

The HIT column 314f stores the value of HIT.

The delay calculation setting column 314g stores a delay calculation setting indicating whether or not to authenticate the relay device 310 by a delay. If the delay calculation setting is "Enable", authentication based on the delay is performed, and if the delay calculation setting is "Disable", authentication based on the delay is not performed.

The transfer delay period column 314h stores a transfer delay period indicating a range of allowable transfer delays.

As described above, in the authentication data table 314a, the input/output port number, the authentication data, the authentication setting, the value of VALID, the value of HIT, the delay calculation setting, and the transfer delay period are associated with each other.

To return to FIG. 15, the authentication packet generating unit 316 manages the period until the authentication packet is transmitted as a transmission timer.

The authentication packet generating unit 316 generates an authentication packet every time a transmission timer expires and supplies the authentication packet to the relay processing unit 112. Here, when generating an authentication packet, the authentication packet generating unit 316 acquires the time from the time synchronization processing unit 320, and stores the acquired time as the transmission time of the authentication packet in the authentication packet.

Figure 17:
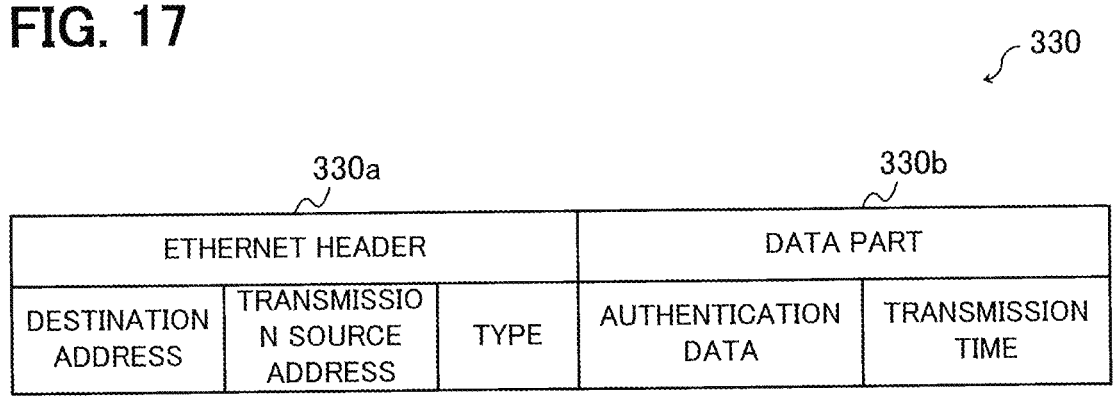
FIG. 17 is a schematic diagram illustrating an example format of an authentication packet according to Embodiment 3.

FIG. 17 is a schematic diagram illustrating an example of the format of the authentication packet 330.

The authentication packet 330 includes an Ethernet header 330a and a data part 330b.

The Ethernet header 330a holds a destination address, a transmission source address, and a type.

The data part 330b holds authentication data and transmission time.

In the type of the Ethernet header 330a or the data part 330b, a value indicating that the packet is the authentication packet 330 is set.

To return to FIG. 15, the time synchronization processing unit 320 keeps time in the relay device 310 and synchronizes the time with another relay device 310. The time may be synchronized by, for example, NTP (Network Time Protocol) or GPS (Global Positioning System).

The delay calculation unit 321 compares the transmission time in the authentication packet 330 with the time when the authentication packet 330 is received to calculate the delay. As for the time when the authentication packet 330 is received, the time obtained from the time synchronization processing unit 320 when the authentication processing unit 313 acquires the authentication packet 330 from the relay processing unit 112 may be used.

Further, the delay calculation unit 321 manages the period until the transfer delay period stored in the authentication data table 314a is updated as an update timer.

Part or all of the relay processing unit 112, the authentication processing unit 313, the aging processing unit 115, the authentication packet generating unit 316, the time synchronization processing unit 320, and the delay calculation unit 321 described above can be implemented by the processing circuit 10 as shown in FIG. 6A, for example.

Further, as shown in FIG. 6B, for example, part of the relay processing unit 112, the authentication processing unit 313, the aging processing unit 115, the authentication packet generating unit 316, the time synchronization processing unit 320, and the delay calculation unit 321 may be implemented by the memory 11 and the processor 12 for executing the program stored in the memory 11.

Figure 18:
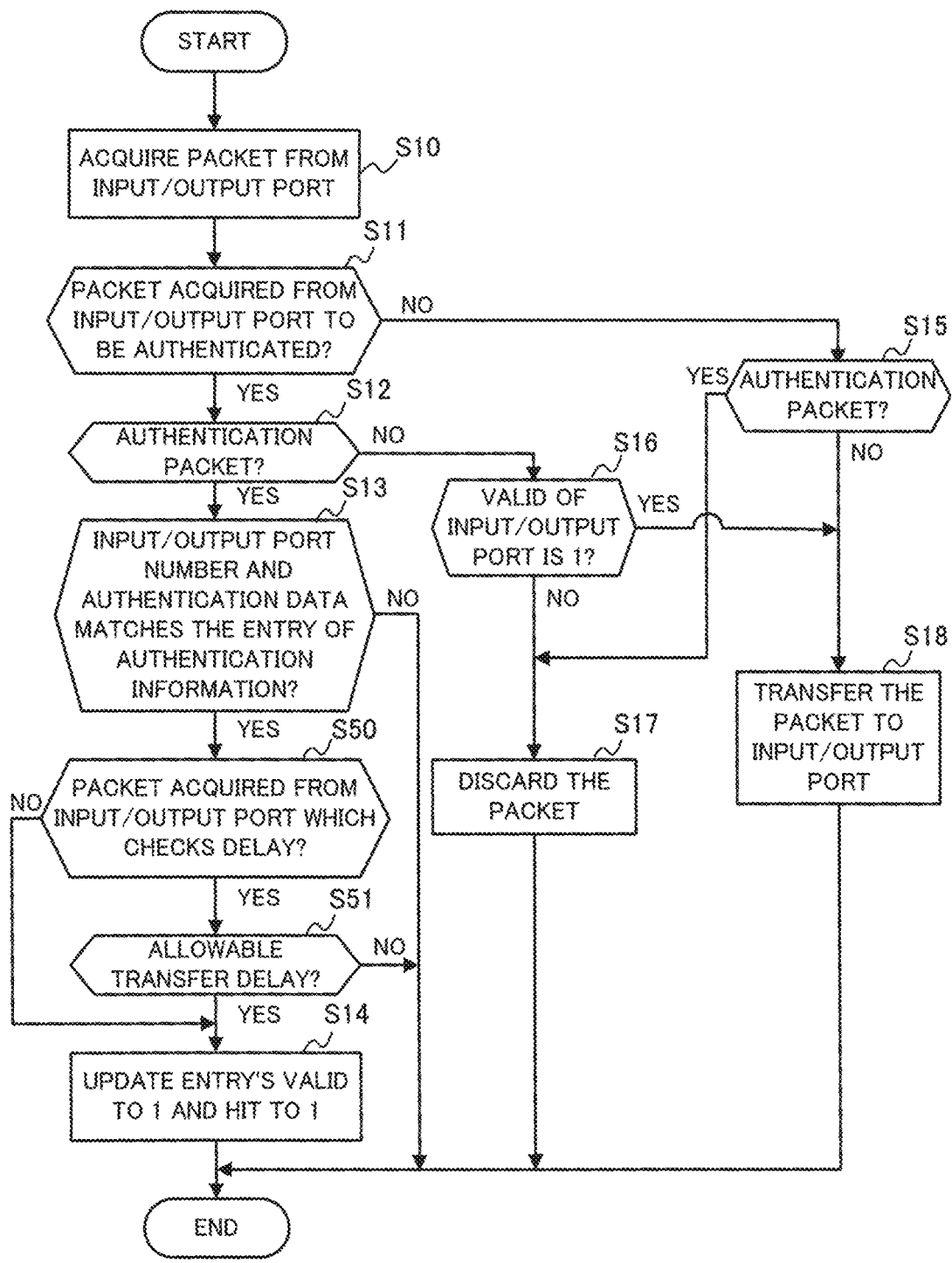
FIG. 18 is a flowchart indicating an authentication operation of a relay device according to Embodiment 3.

FIG. 18 is a flowchart indicating an authentication operation of the relay device 310 in Embodiment 3.

In the processes of the flowchart shown in FIG. 18, processes similar to those of the flowchart shown in FIG. 7 in Embodiment 1 are denoted by the same reference numerals as those in FIG. 7, and detailed description thereof will be omitted.

The processes of steps S10 to S18 in FIG. 18 is the same as the processes of steps S10 to S18 in FIG. 7.

However, when it is determined to be Yes in step S13 of FIG. 18, in other words, when the authentication data of the entry corresponding to the input/output port number which the relay processing unit 112 notifies the authentication processing unit 313 of matches the authentication data held in the authentication packet 330 supplied from the relay processing unit 112, the process proceeds to step S50 of FIG. 18.

In step S50, the relay processing unit 112 refers to the authentication data table 314a to determine whether the delay calculation setting of the entry corresponding to the input/output port 111 that has received the authentication packet 330 is "Enable". In other words, it is determined whether the relay device 310 connected to the input/output port 111 that has received the authentication packet 330 is a relay device to be authenticated by the delay. If it is "Enable" (Yes in S50), the process proceeds to step S51, and if it is not "Enable" but "Disable" (No in S50), the process proceeds to step S14.

In step S51, the authentication processing unit 313 acquires the time of acquiring the authentication packet 330 from the relay processing unit 112 from the time synchronization processing unit 320, and supplies the acquired time as the reception time to the delay calculation unit 321 together with the transmission time held in the authentication packet 330. Then, the delay calculation unit 321 calculates the delay of the authentication packet 330 by subtracting the transmission time from the reception time, and responds to the authentication processing unit 313 with the calculated delay. Then, the authentication processing unit 313 refers to the authentication data table 314a stored in the authentication information storage unit 314 to determine whether the responded delay is included in the range indicated by the transfer delay period of the entry corresponding to the input/output port number which the relay processing unit 112 notifies the authentication processing unit 313 of, in other words, whether the responded delay is an allowable transfer delay. If the responded delay is an allowable transfer delay (Yes in S51), the process proceeds to step S14, and if the responded delay exceeds the allowable transfer delay (No in S51), the process ends.

Figure 19:
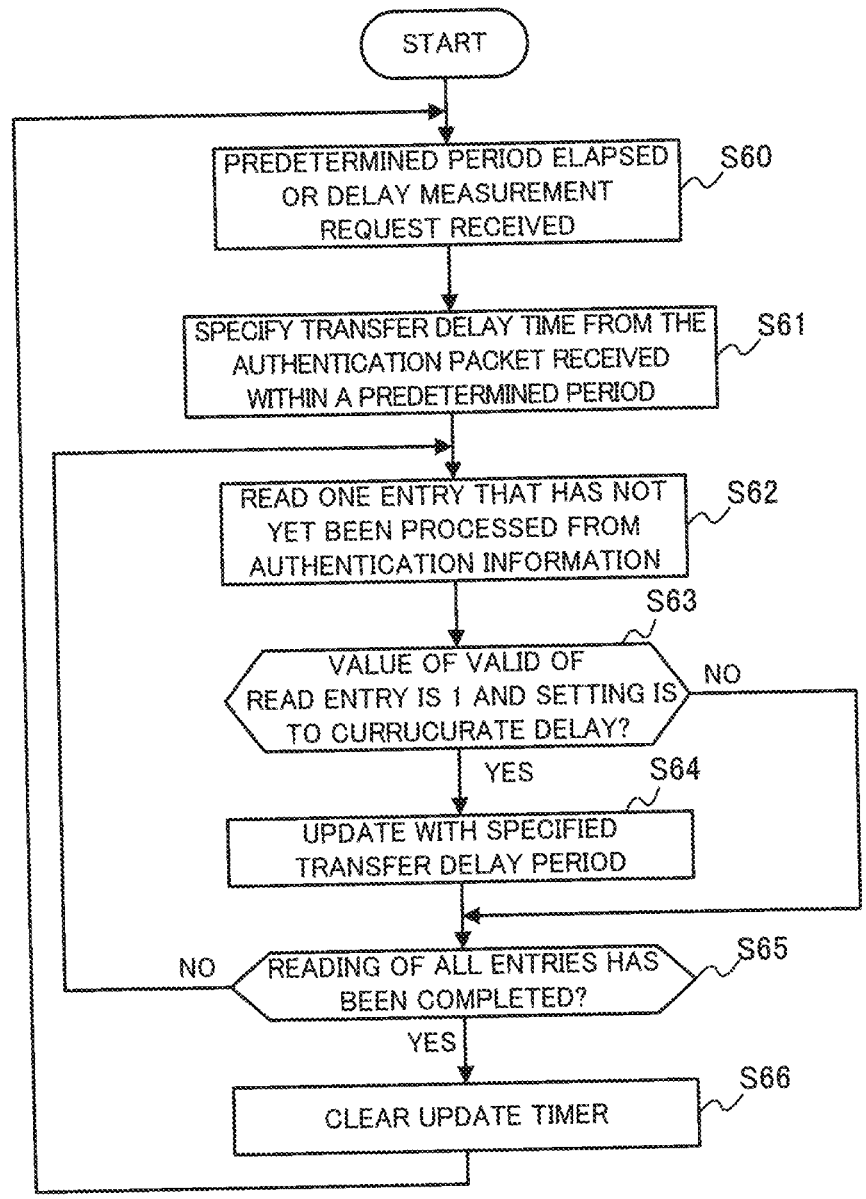
FIG. 19 is a flowchart indicating an update operation of a transfer delay period of an authentication data table.

FIG. 19 is a flowchart indicating an update operation of the transfer delay period of the authentication data table 314a.

The delay calculation unit 321 starts the update operation of the transfer delay period at the timing when the update timer held by the delay calculation unit 321 expires, in other words, at the timing when a predetermined transfer delay period update standby period elapses, or at the timing when the user makes the delay measurement request (S60). The user may make a delay measurement request by using an input unit (not shown) provided in the relay device 310, or may make a delay measurement request by sending a packet holding the delay measurement request from any of the terminal devices 101A to 101E to the relay device 310.

The authentication processing unit 313 specifies a transfer delay period for each input/output port number (S61). The authentication processing unit 313 specifies the transfer delay period according to the minimum value and the maximum value of the delay for each input/output port number by using the delays stored for each input/output port number, for example. Specifically, the authentication processing unit 313 specifies the transfer delay period according to the range between the minimum value and the maximum value of the delays for each input/output port number. The authentication processing unit 313 may specify the transfer delay period according to a range which is wider than the range between the minimum value and the maximum value by multiplying at least one of the minimum value and the maximum value by a predetermined coefficient, subtracting a predetermined value from the minimum value, or adding a predetermined value to the maximum value.

The authentication processing unit 313 reads one entry that has not been updated yet from the entries of the authentication data table 314a (S62).

Next, the authentication processing unit 313 determines whether the value of the VALID of the entry read in step S62 is "1" and the delay calculation setting of the entry is "Enable", in other words, whether the authentication of the relay device 310 corresponding to the read entry is succeeded, and whether the authentication by the delay is to be performed on the relay device 310 (S63). If the value of VALID is "1" and the delay calculation setting is "Enable" (Yes in S63), the process proceeds to step S64. If the value of VALID is "0" or the delay calculation setting is "Disable" (No in S63), the process proceeds to step S65.

In step S64, the authentication processing unit 313 updates the transfer delay period of the entry read in step S62 with the transfer delay period specified for the corresponding input/output port number. Then, the process proceeds to step S65.

In step S65, the authentication processing unit 313 determines whether the reading of the entries in the authentication data table 314a has been completed. If all entries have been read (Yes in S65), the process proceeds to step S66, and if there is any entry that has not been read yet (No in S65), the process returns to step S62.

In step S66, the delay calculation unit 321 clears the update timer in response to an instruction from the authentication processing unit 313, and measures the predetermined transfer delay period update standby period again.

Figure 20:
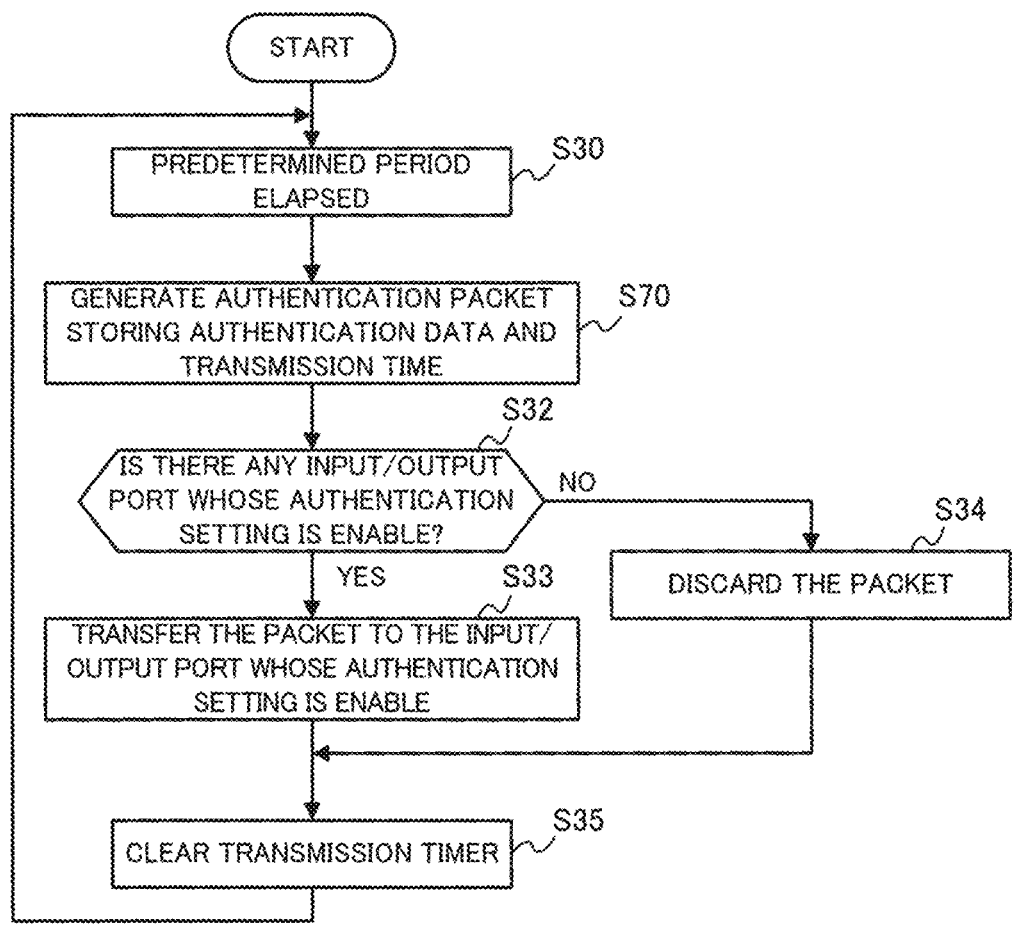
FIG. 20 is a flowchart indicating an operation of a relay device according to Embodiment 3 to transmit an authentication packet.

FIG. 20 is a flowchart indicating an operation of the relay device 310 to transmit the authentication packet 330.

In the processes of the flowchart shown in FIG. 20, processes similar to those of the flowchart shown in FIG. 9 in Embodiment 1 are denoted by the same reference numerals as those in FIG. 9, and detailed description thereof will be omitted.

The process of step S30 in FIG. 20 is the same as the process of step S30 in FIG. 9. However, after the process of step S30, the process proceeds to step S70.

In step S70, the authentication packet generating unit 316 acquires a time from the time synchronization processing unit 320, generates the authentication packet 330 holding the acquired time as the transmission time in the data part 330b together with authentication data, and sends the authentication packet 330 to the relay processing unit 112. Then, the process proceeds to step S32.

The processes of steps S32 to S35 in FIG. 20 is the same as the processes of steps S32 to S35 in FIG. 9.

As described above, according to Embodiment 3, by confirming the transfer delay of the authentication packet 330, when another device having a function of passing through the authentication packet 330 is inserted between the relay devices 310, it is possible to detect an identity fraud or the other frauds caused by such another device according to a change in the transfer delay. Therefore, in Embodiment 3, it is possible to improve the security of the network, for example, to prevent unauthorized use of the network.

It should be noted that Embodiment 3 is not limited to the relay device 310, and can be applied to any device having a time synchronization function and transmitting packets.

Embodiment 4

In Embodiment 1, an authentication operation is performed with the authentication data of the relay device 110 and, in Embodiment 4, the packet length of the authentication packet is changed randomly, and the packet length information of the authentication packet to be transmitted next is added to the authentication packet to be transmitted currently, whereby the authentication operation is performed by checking the packet length of the authentication packet.

As shown in FIG. 1, the communication system 400 according to Embodiment 4 includes a plurality of relay devices 410A to 410D.

Because each of the plurality of relay devices 410A to 410D is configured similarly, when it is not necessary to particularly distinguish each of the plurality of relay devices 410A to 410D, each of the relay devices 410A to 410D is referred to as a relay device 410.

Also in Embodiment 4, the terminal devices 101A to 101E perform communication via the relay devices 410.

Figure 21:
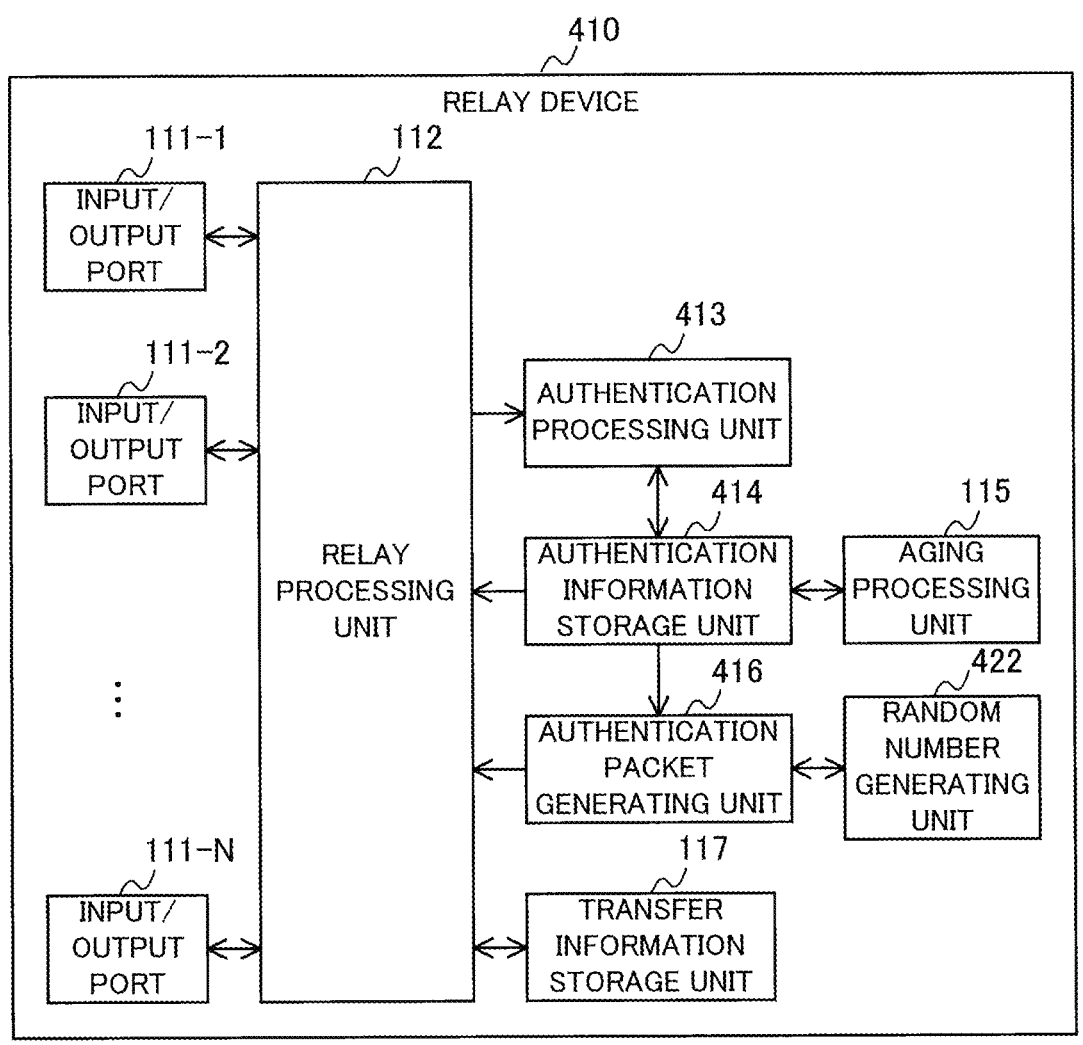
FIG. 21 is a block diagram schematically illustrating a configuration of a relay device according to Embodiment 4.

FIG. 21 is a block diagram schematically illustrating a configuration of the relay device 410.

The relay device 410 includes a plurality of input/output ports 111, a relay processing unit 112, an authentication processing unit 413, an authentication information storage unit 414, an aging processing unit 115, an authentication packet generating unit 416, a transfer information storage unit 117, and a random number generating unit 422.

The input/output port 111, the relay processing unit 112, the aging processing unit 115, and the transfer information storage unit 117 of the relay device 410 in Embodiment 4 are the same as the input/output port 111, the relay processing unit 112, the aging processing unit 115, and the transfer information storage unit 117 of the relay device 110 in Embodiment 1.

When acquiring an authentication packet from the relay processing unit 112, the authentication processing unit 413 authenticates another relay device 410 by using the authentication information stored in the authentication information storage unit 414. For example, the authentication processing unit 413 performs authentication with the authentication data in the same way as Embodiment 1 and also performs authentication with the packet length of the authentication packet.

The authentication processing unit 413 also has a function of editing the authentication information stored in the authentication information storage unit 414.

The authentication information storage unit 414 stores authentication information used for performing authentication of another relay device 110.

FIG. 22 is a schematic diagram illustrating an authentication data table 414a as an example of the authentication information in Embodiment 4.

The authentication data table 414a includes an input/output port number column 414b, an authentication data column 414c, an authentication setting column 414d, a VALID column 414e, an HIT column 414f, a packet length determination setting column 414g, and a packet length column 414h, and each row is an entry for storing data for authenticating each relay device 410.

An input/output port number column 414b stores an input/output port number.

The authentication data column 414c stores authentication data used for performing authentication of a relay device 410.

The authentication setting column 414d stores an authentication setting indicating whether or not to authenticate the relay device 410.

The VALID column 414e stores a value of VALID indicating whether the authentication of the relay device 410 is succeeded.

The HIT column 414f stores a value of HIT indicating whether an authentication packet that has been successfully authenticated was received from the relay device 410 within the aging timer.

The packet length determination setting column 414g stores a packet length determination setting indicating whether or not to perform authentication of the relay device 410 with the packet length of the authentication packet. If the packet length determination setting is "Enable", authentication with the packet length is performed, and if the packet length determination setting is "Disable", authentication with the packet length is not performed.

The packet length column 414h stores a next packet length indicating the packet length of the next authentication packet.

As described above, in the authentication data table 414a, the input/output port number, the authentication data, the authentication setting, the value of VALID, the value of HIT, the packet length determination setting, and the next packet length are associated with each other.

To return to FIG. 21, the authentication packet generating unit 416 manages the period until the authentication packet is transmitted as a transmission timer. The transmission timer is to be shorter than the aging timer.

The authentication packet generating unit 416 generates an authentication packet every time a transmission timer expires and supplies the authentication packet to the relay processing unit 112.

Here, when generating an authentication packet, the authentication packet generating unit 416 acquires from the random number generating unit 422 current random number information indicating current random numbers corresponding to the packet length of the current authentication packet and next random number information indicating next random numbers corresponding to the packet length of the next authentication packet. The authentication packet generating unit 416 generates an authentication packet including the authentication data and the packet length of the next authentication packet which is the packet length corresponding to the next random number so that the generated authentication packet can have the packet length corresponding to the current random number.

Figure 23:
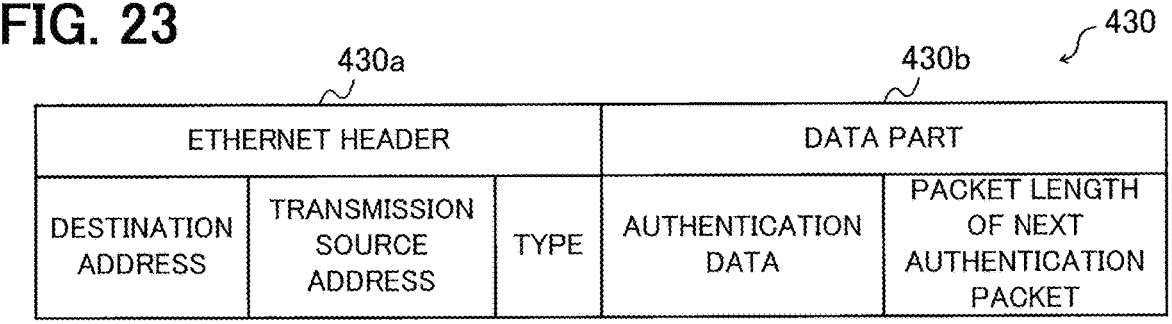
FIG. 23 is a schematic diagram illustrating an example format of an authentication packet according to Embodiment 4.

FIG. 23 is a schematic diagram illustrating an example of the format of the authentication packet 430.

The authentication packet 430 includes an Ethernet header 430a and a data part 430b.

The Ethernet header 430a holds a destination address, a transmission source address, and a type.

The data part 430b holds authentication data and the packet length of the next authentication packet.

In the type of the Ethernet header 430a or the data part 430b, a value indicating that the packet is the authentication packet 430 is set.

The authentication packet generating unit 416 changes the data length of the authentication packet 430 by padding the data part 430b, for example.

The random number generating unit 422 generates a random number and supplies random number information indicating the generated random number to the authentication packet generating unit 416. For example, when the range of the packet length of the authentication packet is predetermined by a communication protocol of the relay device 410, the random number generating unit 422 generates a random number so as to achieve a value within the range. When the range of the packet length to be transmitted and received by the relay device 410 has no limitation, for example, when such a range is not defined by the communication protocol, it is desirable that a range suitable as the packet length of the authentication packet is defined in advance, and the random number generating unit 422 generates a random number so as to achieve a value within the defined range.

It should be noted that the update timing of the random number is the timing of receiving an update request from the authentication packet generating unit 416.

Part or all of the relay processing unit 112, the authentication processing unit 413, the aging processing unit 115, the authentication packet generating unit 416, and the random number generating unit 422 described above can be implemented by a processing circuit 10 as shown in FIG. 6A, for example.

Further, as shown in FIG. 6B, for example, part of the relay processing unit 112, the authentication processing unit 413, the aging processing unit 115, the authentication packet generating unit 416, and the random number generating unit 422 may be implemented by the memory 11 and the processor 12.

Figure 24:
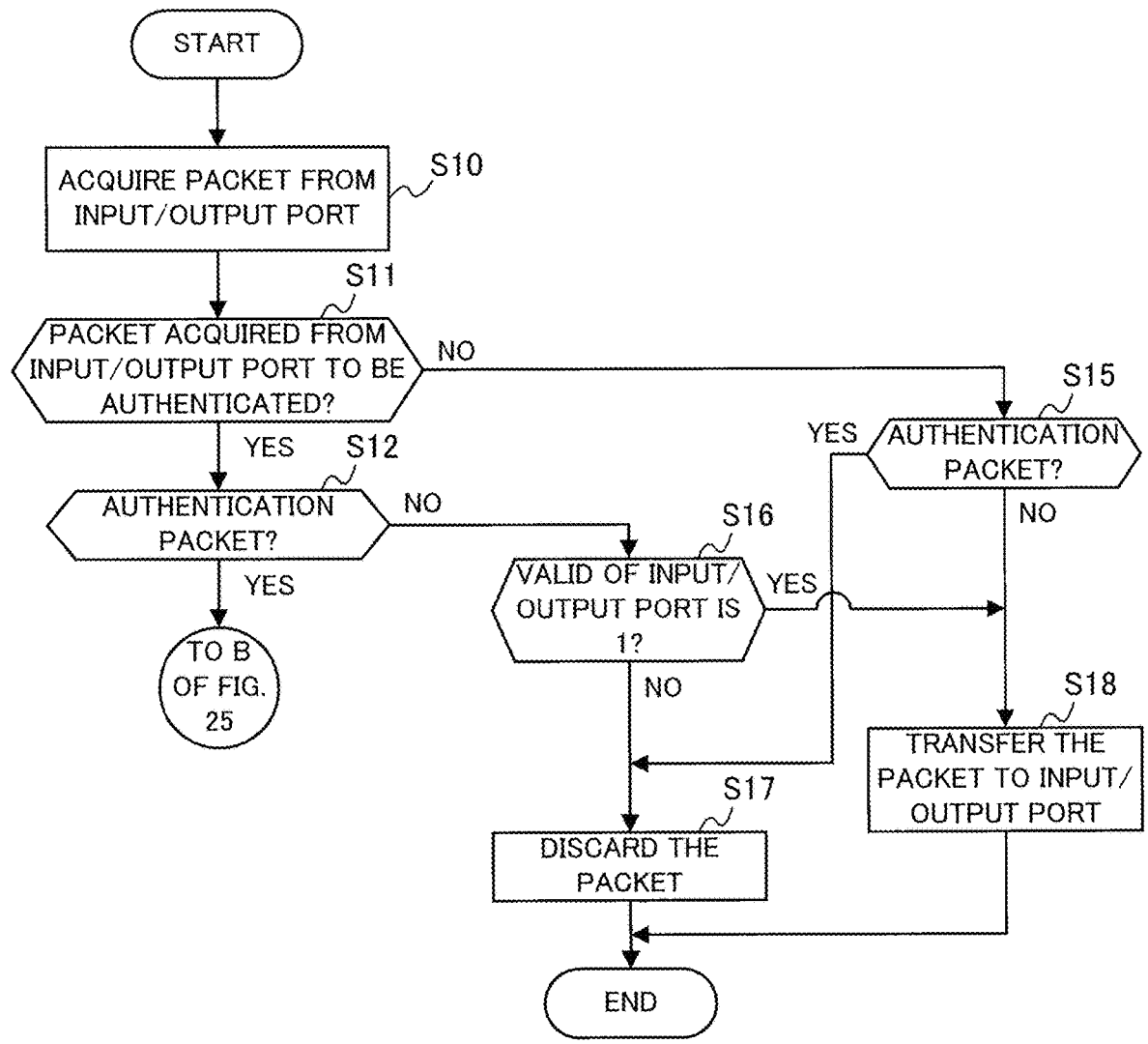
FIG. 24 is a first flowchart indicating an authentication operation of a relay device according to Embodiment 4.
Figure 25:
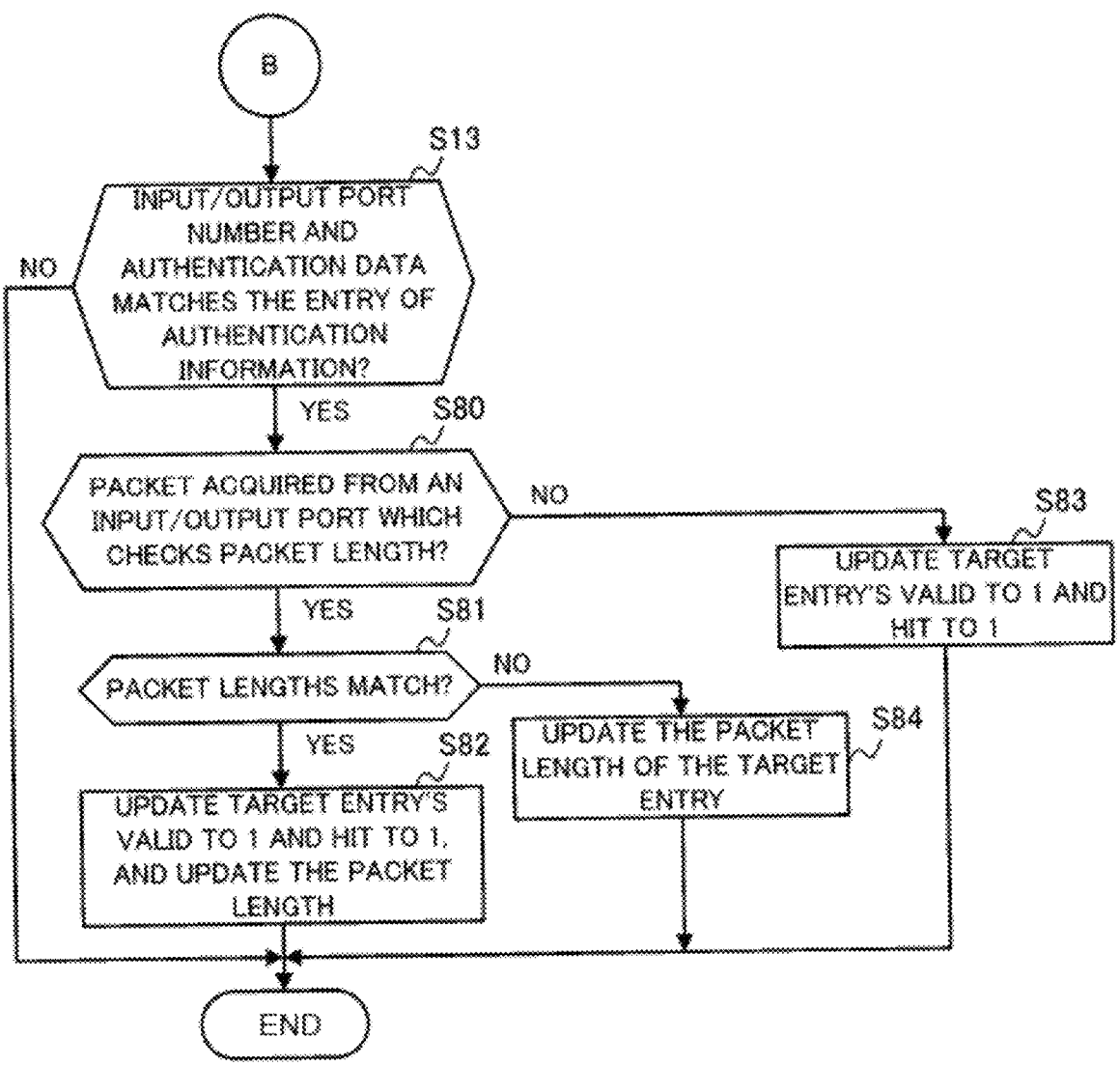
FIG. 25 is a second flowchart indicating an authentication operation of a relay device according to Embodiment 4.

FIGS. 24 and 25 are flowcharts illustrating an authentication operation of the relay device 410 in Embodiment 4.

In the processes of the flowcharts shown in FIGS. 24 and 25, processes similar to those of the flowchart shown in FIG. 7 in Embodiment 1 are denoted by the same reference numerals as those of FIG. 7, and detailed description thereof will be omitted.

The processes of steps S10 to S13 and steps S15 to S18 in FIGS. 24 and 25 are the same as those of steps S10 to S13 and steps S15 to S18 in FIG. 7.

However, if it is determined to be Yes in step S13 of FIG. 25, in other words, if the authentication data of the entry corresponding to the input/output port number which the relay processing unit 112 notifies the authentication processing unit 413 of matches the authentication data held in the authentication packet 430 supplied from the relay processing unit 112, the process proceeds to step S80 of FIG. 25.

In step S80, the relay processing unit 112 refers to the authentication data table 414a to determine whether the packet length determination setting of the entry corresponding to the input/output port 111 that has received the authentication packet is "Enable". In other words, it is determined whether the relay device 410 connected to the input/output port 111 that has received the authentication packet 430 is a relay device to be authenticated with the packet length. If it is "Enable" (Yes in S80), the process proceeds to step S81, and if it is not "Enable" but "Disable" (No in S80), the process proceeds to step S83.

In step S81, the authentication processing unit 413 refers to the authentication data table 414a stored in the authentication information storage unit 414 to determine whether the packet length of the authentication packet 430 supplied from the relay processing unit 112 matches the next packet length of the entry corresponding to the input/output port number which the relay processing unit 112 notifies the authentication processing unit 413 of. If they match (Yes in S81), the process proceeds to step S82, and if they do not match (No in S81), the process proceeds to step S84.

In step S82, since the authentication based on the packet length is succeeded, the authentication processing unit 413 updates the value of VALID of the entry corresponding to the input/output port number which the relay processing unit 112 notifies the authentication processing unit 413 of to "1" and the value of HIT to "1", and stores the packet length of the next authentication packet included in the authentication packet 430 as the next packet length of the entry.

In step S83, since the authentication with the packet length is not performed and the authentication with the authentication data has been succeeded, the authentication processing unit 413 updates the value of the VALID of the entry corresponding to the input/output port number which the relay processing unit 112 notifies the authentication processing unit 413 of to "1" and the value of the HIT to "1".

In step S84, since the authentication with the packet length has been failed, but the authentication with the authentication data has been succeeded, the authentication processing unit 413 stores the packet length of the next authentication packet included in the authentication packet as the next packet length of the entry corresponding to the input/output port number which the relay processing unit 112 notifies the authentication processing unit 413 of.

Figure 26:
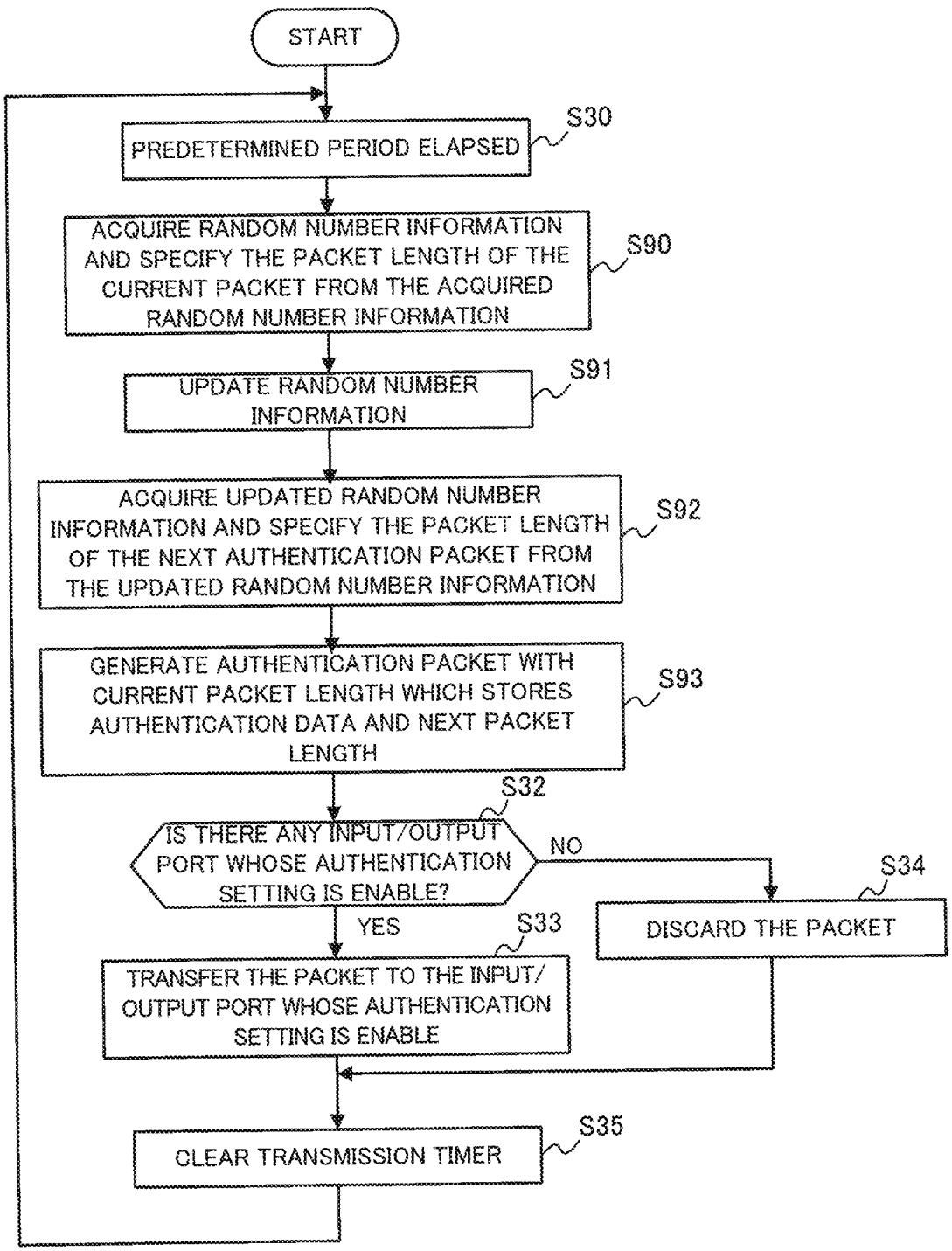
FIG. 26 is a flowchart indicating an operation of a relay device in Embodiment 4 to transmit an authentication packet.

FIG. 26 is a flowchart indicating an operation of the relay device 410 to transmit the authentication packet 430.

In the processes of the flowchart shown in FIG. 26, processes similar to those of the flowchart shown in FIG. 9 in Embodiment 1 are denoted by the same reference numerals as those in FIG. 9, and detailed description thereof will be omitted.

The process of step S30 in FIG. 26 is the same as the process of step S30 in FIG. 9. However, after the process of step S30, the process proceeds to step S90.

In step S90, the authentication packet generating unit 416 acquires the random number information from the random number generating unit 422 and specifies the packet length of the current authentication packet from the acquired random number information.

Next, the authentication packet generating unit 416 requests the random number generating unit 422 to update the random number information, and in response to such a request, the random number generating unit 422 updates the random number information (S91).

Then, the authentication packet generating unit 416 acquires the updated random number information and specifies the packet length of the next authentication packet according to the acquired random number information (S92).

Next, the authentication packet generating unit 416 generates the authentication packet 430 holding the packet length specified in step S92 as the packet length of the next authentication packet in the data part 430b together with the authentication data (S93). Here, the authentication packet generating unit 416 pads the data part 430b so that the packet length of the generated authentication packet 430 can become the packet length specified in step S90. Then, the authentication packet generating unit 416 sends the authentication packet 430 to the relay processing unit 112. Then, the process proceeds to step S32.

The processes of steps S32 to S35 in FIG. 26 is the same as the processes of steps S32 to S35 in FIG. 9.

As described above, according to Embodiment 4, by randomly changing the packet length of the authentication packet 430 and adding the packet length of the authentication packet to be transmitted next to the authentication packet 430, it is possible to prevent the authentication packet 430 from being imitated. Thus, the security of the network can be improved.

It should be noted that Embodiment 4 is not limited to the relay device 410, and can be applied to any device having a random number generating unit and transmitting packets.

DESCRIPTION OF REFERENCE CHARACTERS 100, 200, 300, 400 communication system, 110, 210, 310, 410 relay device, 111 input/output port, 112 relay processing unit, 113, 213, 313, 413 authentication processing unit, 114, 314, 414 authentication information storage unit, 115 aging processing unit, 116, 316, 416 authentication packet generating unit, 117 transfer information storage unit, 218 query unit, 219 query information storage unit, 320 time synchronization processing unit, 321 delay calculation unit, 422 random number generating unit

What is claimed is:

1. A relay device, comprising:
a plurality of input/output ports each of which is connected to each of a plurality of devices including a plurality of relay devices;
a memory to store authentication information used for performing authentication of a target relay device which is a relay device to be authenticated in the plurality of relay devices; and
processing circuitry
to acquire a target authentication packet via a target input/output port, the target authentication packet being an authentication packet used for performing the authentication of the target relay device, the target input/output port being an input/output port connected to the target relay device in the plurality of input/output ports, to perform the authentication of the target relay device by referring to the authentication information, wherein the authentication information includes a first flag and a second flag in association with each of the plurality of relay devices, and the processing circuitry updates the first flag associated with the target relay device to a first value and updates the second flag associated with the target relay device to a third value when the authentication of the target relay device is succeeded, wherein, each time a predetermined aging update standby period elapses, the processing circuitry selects a relay device out of the plurality of relay devices sequentially one by one, updates the first flag associated with the selected relay device to a second value when the second flag associated with the selected relay device is a fourth value, and updates the second flag associated with the selected relay device to the fourth value when the second flag associated with the selected relay device is the third value, and wherein the processing circuitry determines that the authentication of the target relay device is succeeded when the first flag associated with the target relay device is the first value and that the authentication of the target relay device is failed when the first flag associated with the target relay device is the second value, to cause a transfer input/output port to output a transfer packet acquired via the target input/output port when the authentication of the target relay device is succeeded, the transfer input/output port being an input/output port to which a transfer destination of the transfer packet is connected in the plurality of input/output ports, and to discard the transfer packet when the authentication of the target relay device is failed.

2. The relay device according to claim 1,
wherein the target authentication packet includes authentication data to be used for the authentication of the target relay device,
wherein the authentication information includes comparison authentication data for comparison with the authentication data in association with the target relay device, and
wherein the processing circuitry compares the authentication data with the comparison authentication data to perform the authentication of the target relay device.

3. The relay device according to claim 1,
wherein the authentication information includes an authentication setting indicating whether authentication is to be performed in association with each of the plurality of relay devices, and
wherein the target relay device is a relay device associated with the authentication setting indicating that authentication is to be performed in the plurality of relay devices.

4. The relay device according to claim 1,
wherein the processing circuitry queries at least one of the plurality of relay devices for authentication of the target relay device via at least one of the plurality of input/output ports when the processing circuitry fails to authenticate the target relay device,
wherein the processing circuitry causes the transfer input/output port to output the transfer packet acquired via the target input/output port when the authentication of the target relay device is succeeded in the at least one of the plurality of the relay devices.

5. The relay device according to claim 2,
wherein the target authentication packet further includes a transmission time of the target authentication packet,
wherein the authentication information further includes a range of allowable transfer delays in association with each of the plurality of relay devices, and
wherein the processing circuitry determines that the authentication of the target relay device is succeeded when the authentication data matches the comparison authentication data and a delay from the transmission time to a reception time of the target authentication packet is within the range associated with the target relay device, and that the authentication of the target relay device is failed when the authentication data does not match the comparison authentication data or the delay is out of the range associated with the target relay device.

6. The relay device according to claim 5,
wherein the processing circuitry updates the range included in the authentication information in accordance with a minimum value and a maximum value of delays of a plurality of authentication packets transmitted from an associated relay device in the plurality of relay devices during a predetermined period.

7. The relay device according to claim 1,
wherein the processing circuitry generates a transmission authentication packet which is an authentication packet to be authenticated at the target relay device, and sends the transmission authentication packet to the target relay device via the target input/output port.

8. The relay device according to claim 7,
wherein the processing circuitry puts the packet length of the next authentication packet to be transmitted next to the transmission authentication packet into the transmission authentication packet.

9. A relay device, comprising:
a plurality of input/output ports each of which is connected to each of a plurality of devices including a plurality of relay devices;
a memory to store authentication information used for performing authentication of a target relay device which is a relay device to be authenticated in the plurality of relay devices; and
processing circuitry
to acquire a target authentication packet via a target input/output port, the target authentication packet being an authentication packet used for performing the authentication of the target relay device, the target input/output port being an input/output port connected to the target relay device in the plurality of input/output ports,
to perform the authentication of the target relay device by referring to the authentication information,
to cause a transfer input/output port to output a transfer packet acquired via the target input/output port when the authentication of the target relay device is succeeded, the transfer input/output port being an input/output port to which a transfer destination of the transfer packet is connected in the plurality of input/output ports, and
to discard the transfer packet when the authentication of the target relay device is failed, wherein the target authentication packet includes authentication data to be used for the authentication of the target relay device, wherein the authentication information includes comparison authentication data for comparison with the authentication data in association with the target relay device, and wherein the processing circuitry compares the authentication data with the comparison authentication data to perform the authentication of the target relay device, wherein the target authentication packet further includes a packet length of a next authentication packet which is an authentication packet to be transmitted next to the target authentication packet, wherein the authentication information further includes a next packet length in association with the target relay device, wherein the processing circuitry determines that the authentication of the target relay device is succeeded when the authentication data matches the comparison authentication data and the packet length of the target authentication packet matches the next packet length, and that the authentication of the target relay device is failed when the authentication data does not match the comparison authentication data or the packet length of the target authentication packet does not match the next packet length, and wherein the processing circuitry updates the next packet length so as to indicate the packet length of the next authentication packet.

10. A communication system comprising a plurality of relay devices, wherein one relay device of the plurality of relay devices comprises:

a plurality of input/output ports each of which is connected to each of a plurality of devices including the plurality of relay devices except the one relay device;

a memory to store authentication information used for performing authentication of a target relay device which is a relay device to be authenticated in the plurality of relay devices; and processing circuitry to acquire a target authentication packet via a target input/output port, the target authentication packet being an authentication packet used for performing authentication of the target relay device, the target input/output port being an input/output port connected to the target relay device in the plurality of input/output ports, to perform the authentication of the target relay device by referring to the authentication information, wherein the authentication information includes a first flag and a second flag in association with each of the plurality of relay devices, and the processing circuitry updates the first flag associated with the target relay device to a first value and updates the second flag associated with the target relay device to a third value when the authentication of the target relay device is succeeded, wherein, each time a predetermined aging update standby period elapses, the processing circuitry selects a relay device out of the plurality of relay devices sequentially one by one, updates the first flag associated with the selected relay device to a second value when the second flag associated with the selected relay device is a fourth value, and updates the second flag associated with the selected relay device to the fourth value when the second flag associated with the selected relay device is the third value, and wherein the processing circuitry determines that the authentication of the target relay device is succeeded when the first flag associated with the target relay device is the first value and that the authentication of the target relay device is failed when the first flag associated with the target relay device is the second value, to cause a transfer input/output port to output a transfer packet acquired via the target input/output port when the authentication of the target relay device is succeeded, the transfer input/output port being an input/output port to which a transfer destination of the transfer packet is connected in the plurality of input/output ports, to discard the transfer packet when the authentication of the target relay device is failed, to generate a transmission authentication packet which is an authentication packet to be authenticated at the target relay device, and to send the transmission authentication packet to the target relay device via the target input/output port.

\* \* \* \* \*